US010716054B2

(12) United States Patent
Cherian et al.

(10) Patent No.: US 10,716,054 B2
(45) Date of Patent: Jul. 14, 2020

(54) METHODS AND SYSTEMS FOR CONTROLLING NETWORK ACCESS

(71) Applicant: QUALCOMM Incorporated, San Diego, CA (US)

(72) Inventors: George Cherian, San Diego, CA (US); Alfred Asterjadhi, San Diego, CA (US); Abhishek Pramod Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/141,866

(22) Filed: Sep. 25, 2018

(65) Prior Publication Data

US 2019/0098565 A1  Mar. 28, 2019

Related U.S. Application Data

(60) Provisional application No. 62/726,952, filed on Sep. 4, 2018, provisional application No. 62/564,216, filed on Sep. 27, 2017.

(51) Int. Cl.

| | |
|---|---|
| *H04W 48/16* | (2009.01) |
| *H04W 40/24* | (2009.01) |
| *H04W 48/08* | (2009.01) |
| *H04W 48/14* | (2009.01) |
| *H04W 48/18* | (2009.01) |
| *H04W 84/12* | (2009.01) |
| *H04W 48/12* | (2009.01) |

(52) U.S. Cl.
CPC ......... *H04W 48/16* (2013.01); *H04W 40/244* (2013.01); *H04W 48/08* (2013.01); *H04W 48/14* (2013.01); *H04W 48/18* (2013.01); *H04W 48/12* (2013.01); *H04W 84/12* (2013.01)

(58) Field of Classification Search
CPC ..... H04W 48/14; H04W 48/16; H04W 48/08; H04W 40/244
See application file for complete search history.

(56) References Cited

U.S. PATENT DOCUMENTS

| | | | | |
|---|---|---|---|---|
| 2009/0323608 | A1* | 12/2009 | Adachi | H04W 48/18 370/329 |
| 2015/0163029 | A1* | 6/2015 | Murakami | H04L 27/2627 370/476 |
| 2018/0077572 | A1* | 3/2018 | Trappitt | H04L 67/20 |

* cited by examiner

*Primary Examiner* — Wei Zhao
(74) *Attorney, Agent, or Firm* — Paradice and Li LLP/Qualcomm

(57) ABSTRACT

Methods and systems for accessing networks prohibit uncontrolled communications over a designated network. In some aspects, a method of controlling network access is disclosed. The method comprises transmitting, by a first access point, a first beacon over a first network to a station, the first beacon including information allowing the station to associate with the first access point. The method also comprises receiving a probe request at the first access point over the first network from the station, the probe request including a request for rules for associating with a second network. The method additional comprises generating a probe response to include the rules regarding associating with the second network, wherein the rules do not permit uncontrolled communications over the second network. The method further comprises transmitting the probe response from the first access point to the station over the first network.

30 Claims, 10 Drawing Sheets

METHODS AND SYSTEMS FOR CONTROLLING NETWORK ACCESS

CROSS-REFERENCE TO RELATED APPLICATIONS

This application claims the benefit of priority to U.S. Provisional Appl. No. 62/564,216, filed on Sep. 27, 2017, and titled "METHODS AND SYSTEMS FOR CONTROLLING NETWORK ACCESS" AND U.S. Provisional Appl. No. 62/726,952, filed on Sep. 4, 2018, and titled "METHODS AND SYSTEMS FOR CONTROLLING NETWORK ACCESS", each of which is incorporated in its entirety by reference herein.

TECHNICAL FIELD

This application relates generally to wireless communication, and more specifically to systems and methods for controlling discovery and scanning procedures on wireless networks.

BACKGROUND

Wireless communications systems are widely deployed to provide various types of communication content such as voice, video, packet data, messaging, broadcast, and so on. The wireless communications systems may utilize communications networks to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wi-Fi or WiFi (e.g., IEEE 802.11) is a technology that allows electronic devices to connect to the WLAN. A WiFi network may include an access point (AP) that may communicate with one or more other electronic devices (e.g., computers, cellular phones, tablets, laptops, televisions, wireless devices, mobile devices, "smart" devices, etc.), which can be referred to as stations (STAs). The AP may be coupled to a network, such as the Internet, and may enable one or more STAs to communicate via the network or with other STAs coupled to the AP. Wireless networks are often preferred when the network elements (e.g., APs or STAs) are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Many wireless networks utilize carrier-sense multiple access with collision detection (CSMA/CD) to share a wireless medium. With CSMA/CD, before transmission of data on the wireless medium, a device may listen to the medium to determine whether another transmission is in progress. If the medium is idle, the device may attempt a transmission. The device may also listen to the medium during its transmission, so as to detect whether the data was successfully transmitted, or if perhaps a collision with a transmission of another device occurred. When a collision is detected, the device may wait for a period of time and then re-attempt the transmission. The use of CSMA/CD allows for a single device to utilize a particular channel (such as a spatial or frequency division multiplexing channel) of a wireless network.

As more and more users gain access to networks, and as these users continue to demand greater and greater capacity from their wireless networks, throughput on the networks must increase. In one embodiment, this may be done by controlling discovery and scanning procedures for devices on the networks. For example, an AP may coordinate discovery and scanning procedures for STAs and other APs that use a particular network or networks channel. Accordingly, methods and systems of controlling and coordinating discovery and scanning procedures that improve bandwidth and throughput of the network by reducing random interruptions for discovery and/or scanning are desired.

SUMMARY

Various implementations of systems, methods and devices within the scope of the appended claims each have several aspects, no single one of which is solely responsible for the desirable attributes described herein. Without limiting the scope of the appended claims, some prominent features are described herein.

In some aspects, a method of controlling network access is disclosed. The method comprises transmitting, by a first access point, a first beacon over a first network to a station, the first beacon including information allowing the station to associate with the first access point. The method also comprises receiving a probe request at the first access point over the first network from the station, the probe request including a request for rules for associating with a second network. The method additional comprises generating a probe response to include the rules regarding associating with the second network, wherein the rules do not permit uncontrolled communications over the second network. The method further comprises transmitting the probe response from the first access point to the station over the first network.

In some aspects, another method of accessing networks is disclosed. The method comprises receiving, by a station and from a first access point, a first beacon over a first network, the first beacon including information allowing the station to associate with the first access point. The method also comprises transmitting a probe request from the station to the first access point, the probe request including a request for rules for associating with a second network. The method further comprises receiving, at the station, a probe response from the first access point over the first network, the probe response including the rules regarding associating with the second network, wherein the rules do not permit uncontrolled communications over the second network. The method additionally comprises receiving, at the station, a second beacon over the second network based on the rules received in the probe response.

In some aspects, an apparatus for network access is disclosed. The apparatus comprises a processor, a transmit circuit, and a receiver circuit. The processor is configured to generate a first beacon comprising information allowing a station to associate with the apparatus. The transmit circuit is configured to transmit the first beacon to the station over a first network. The receiver circuit is configured to receive a probe request from the station over the first network, the probe request comprising a request for rules for associating with a second network. The processor is further configured to generate a probe response to include the rules regarding associating with the second network, wherein the rules do not permit uncontrolled communications over the second network. The transmit circuit is further configured to transmit the probe response to the station over the first network.

In another aspect, an apparatus for accessing networks is disclosed. The apparatus comprises a receiver circuit, a processor, and a transmit circuit. The receiver circuit is configured to receive, from a first access point, a first beacon over a first network, the first beacon including information allowing the apparatus to associate with the first access point. The processor is configured to generate a probe request for transmission to the first access point, the probe request comprising a request for rules for associating with a second network. The transmit circuit is configured to transmit the probe request to the first access point over the first network. The receiver circuit is further configured to receive a probe response from the first access point over the first network, the probe response including the rules regarding associating with the second network, wherein the rules do not permit uncontrolled communications over the second network and receive a second beacon from the second access point over the second network based on the rules received in the probe response.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
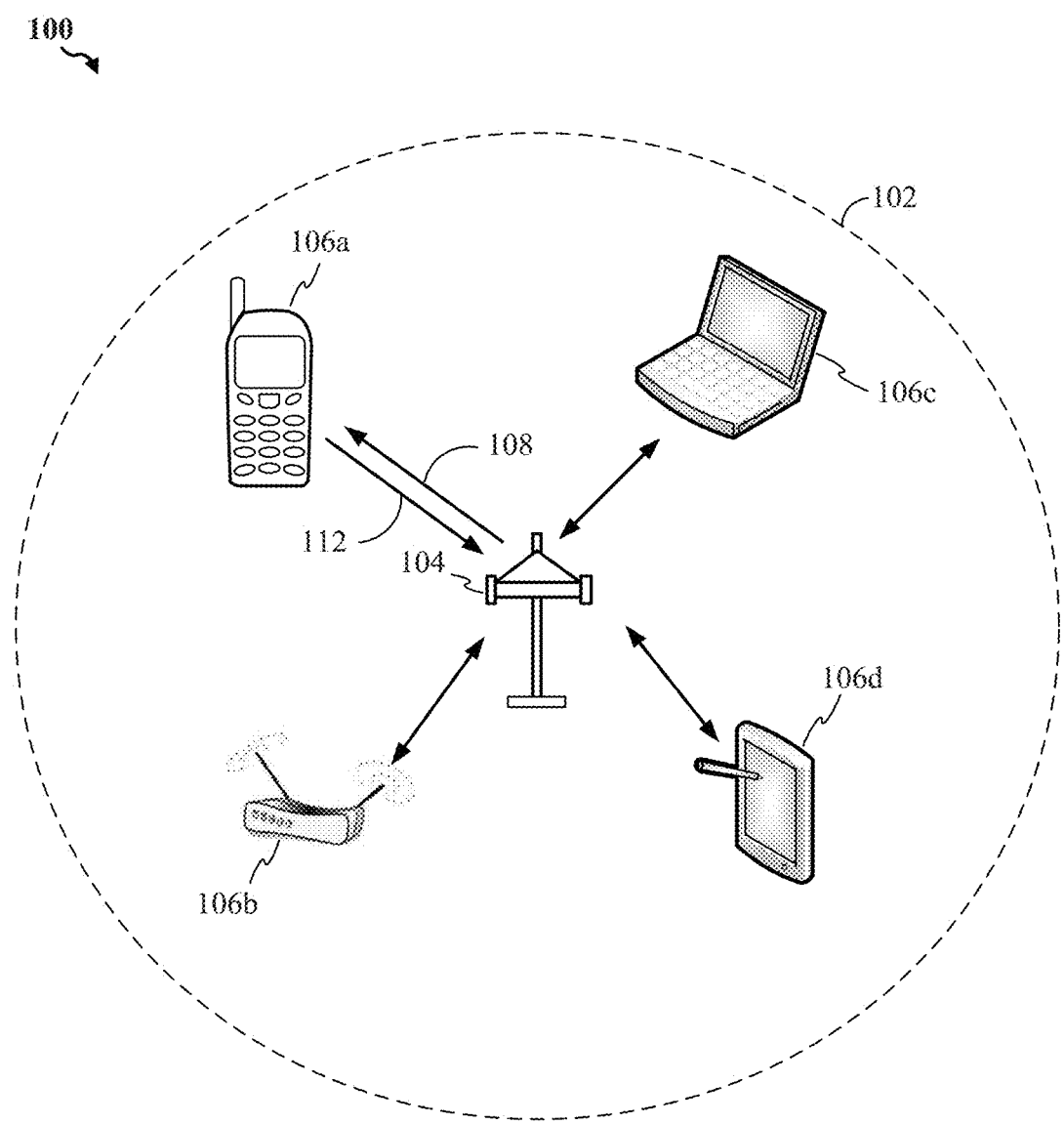
FIG. 1 schematically illustrates an example wireless communication system in which aspects of the present disclosure may be employed.

Various aspects of the novel systems, apparatuses, and methods are described more fully hereinafter with reference to the accompanying drawings. The teachings of the disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently or combined with any other aspect of the disclosure. In addition, the scope is intended to cover such an apparatus or method which is practiced using other structure and functionality as set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary' is not necessarily to be construed as preferred or advantageous over other implementations. The following description is presented to enable any person skilled in the art to make and use the embodiments described herein. Details are set forth in the following description for purpose of explanation. It should be appreciated that one of ordinary skill in the art would realize that the embodiments may be practiced without the use of these specific details. In other instances, well known structures and processes are not elaborated in order not to obscure the description of the disclosed embodiments with unnecessary details. Thus, the present application is not intended to be limited by the implementations shown, but is to be accorded with the widest scope consistent with the principles and features disclosed herein.

Wireless access network technologies may include various types of wireless local area access networks (WLANs). A WLAN may be used to interconnect nearby devices together, employing widely used access networking protocols. The various aspects described herein may apply to any communication standard, such as Wi-Fi or, more generally, any member of the IEEE 802.11 family of wireless protocols.

In some implementations, a WLAN includes various devices which access the wireless access network. For example, there may be: access points (also referred to as "APs") and clients (also referred to as stations, or "STAs"). In general, an AP serves as a hub or a base station for the STAs in the WLAN. A STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area access networks. In some implementations, an STA may also be used as an AP.

An AP may comprise, be implemented as, or known as a NodeB, Radio Access network Controller ("RNC"), eNodeB ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A STA may also comprise, be implemented as, or known as a user terminal, an access terminal ("AT"), a subscriber station, a subscriber unit, a mobile station, a remote station, a remote terminal, a user agent, a user device, a user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, a Node-B (Base-station), or any other suitable device that is configured to communicate via a wireless medium.

The techniques described herein may be used for various wireless communication networks such as Code Division Multiple Access (CDMA) networks, Spatial Division Multiple Access (SDMA), Time Division Multiple Access (TDMA) networks, Frequency Division Multiple Access (FDMA) networks, Orthogonal FDMA (OFDMA) networks, Single-Carrier FDMA (SC-FDMA) networks, and so forth. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). The cdma2000 covers IS-2000, IS-95 and IS-856 standards. An SDMA system may utilize sufficiently different directions to simultaneously transmit data belonging to multiple user terminals. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art.

FIG. 1 schematically illustrates an example wireless communication system 100 in which aspects of the present disclosure may be employed. For simplicity, only one AP 104 is shown in FIG. 1. As described above, the AP 104 communicates with the STAs 106a-d (also referred to herein collectively as "the STAs 106" or individually as "the STA 106"). The STA 106 may also be referred to as a base station or using some other terminology. Also, as described above, the STA 106 may be fixed or mobile and may also be referred to as a user terminal, a mobile station, a wireless device, or using some other terminology. The AP 104 may communicate with one or more STAs 106 at any given moment via communications link 110. The communication link 110 that facilitates transmission from the AP 104 to one or more of the STAs 106 may be referred to as a downlink (DL) 108, and the communication link 110 that facilitates transmission from one or more of the STAs 106 to the AP 104 may be referred to as an uplink (UL) 112. Alternatively, a downlink 108 may be referred to as a forward link or a forward channel, and an uplink 112 may be referred to as a reverse link or a reverse channel. A STA 106 may also communicate peer-to-peer with another STA 106. In some embodiments, one or more of the AP 104 and the STAs 106 may operate on one or more of the 2.4 GHz, 5 GHz, and 6 GHz networks.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network (e.g. TDLS, WiFi-Direct) between the STAs 106. Accordingly, the functions of the AP 104 described herein may alternatively be performed by one or more of the STAs 106.

Portions of the following disclosure will describe STAs 106 capable of communicating via any of the communication networks described above (e.g., SDMA). Thus, for such aspects, the AP 104 may be configured to communicate with both SDMA and non-SDMA STAs. This approach may conveniently allow older versions of STAs (e.g., "legacy" STAs) that do not support SDMA to remain deployed in an enterprise, extending their useful lifetime, while allowing newer SDMA STAs to be introduced as deemed appropriate.

In some embodiments, system 100 may employ multiple transmit and multiple receive antennas for data transmission on the downlink and uplink for one or more of the AP 104 and the STAs 106. For example, the AP 104 may be equipped with N antennas that provide for multiple-inputs (MI) for uplink transmissions and multiple-outputs (MO) for downlink transmissions. A set of K selected STAs 106 collectively represents the multiple-output for downlink transmissions and the multiple-input for uplink transmissions. For pure SDMA, it may be desired to have $N \leq K \leq 1$ if the data symbol streams for the K STAs 106 are not multiplexed in code, frequency or time by some means. K may be greater than N if the data symbol streams can be multiplexed using TDMA technique, different code channels with CDMA, disjoint sets of sub-bands with OFDM, and so on. Each selected STA 106 may transmit user-specific data to and/or receive user-specific data from the AP 104. In general, each selected STA 106 may be equipped with one or multiple antennas (i.e., M 21). The K selected STAs 106 can have the same number of antennas, or one or more STAs 106 may have a different number of antennas than other STAs 106 or the AP 104.

The system 100 may be a time division duplex (TDD) system or a frequency division duplex (FDD) system. For a TDD system, the downlink and uplink share the same frequency band. For an FDD system, the downlink and uplink use different frequency bands. The system 100 may also utilize a single carrier or multiple carriers for transmission. Each STA 106 may be equipped with a single antenna (e.g., to keep costs down) or multiple antennas (e.g., where the additional cost can be supported). The system 100 may also be a TDMA system if the STAs 106 share the same frequency channel by dividing transmission/reception into different time slots, where each time slot may be assigned to a different STA 106.

Figure 2:
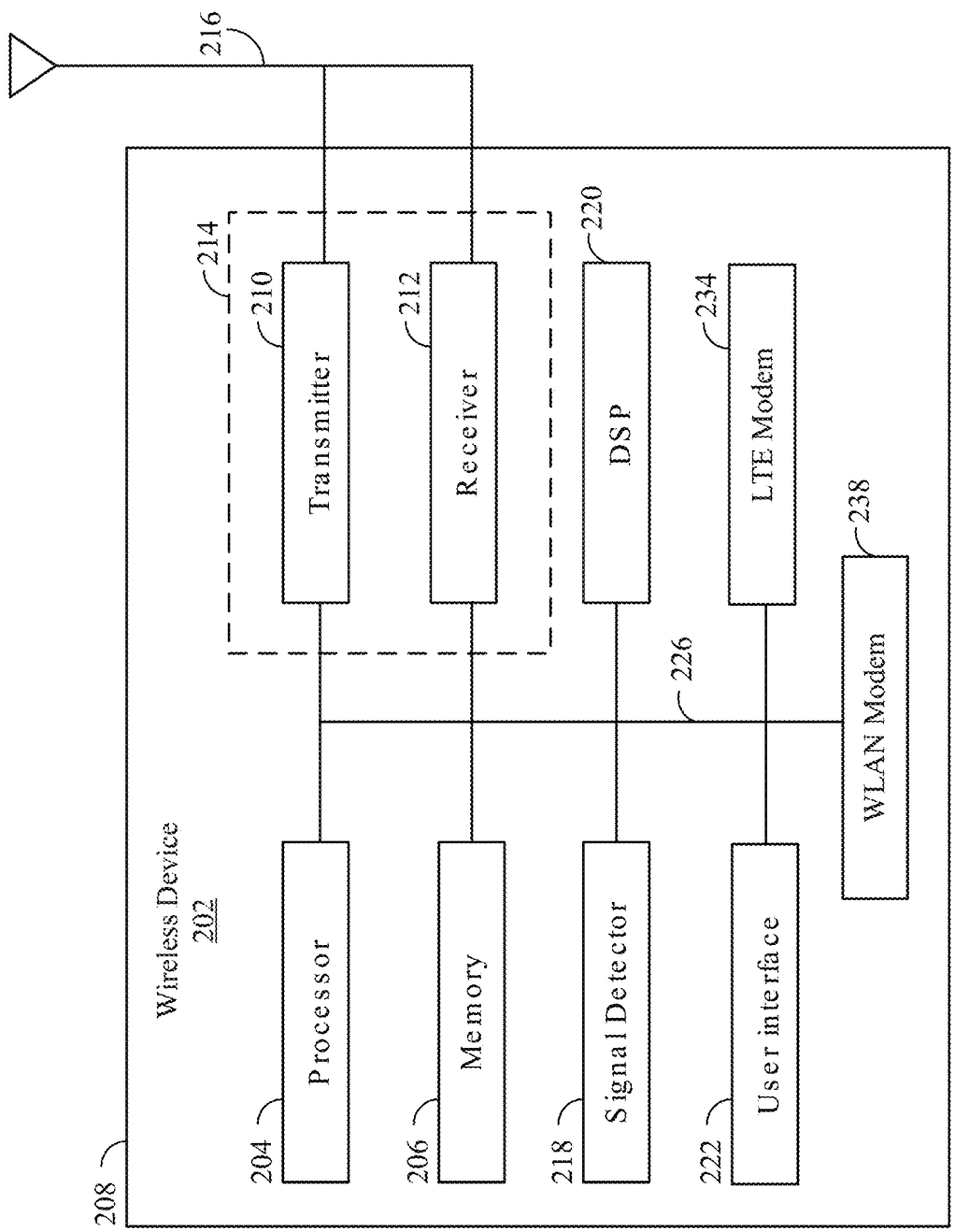
FIG. 2 schematically illustrates an example wireless device that may be employed within the example wireless communication system of FIG. 1.

FIG. 2 illustrates various components that may be utilized in a wireless device 202 that may be employed within the wireless communication system 100. The wireless device 202 is an example of a device that may be configured to implement the various methods described herein. The wireless device 202 may implement one or both of the AP 104 or the STA 106.

The wireless device 202 may include an electronic hardware processor (also referred to as a "processor") 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 may perform logical and arithmetic operations based on program instructions stored within the memory 206. The instructions in the memory 206 may be executable to implement the methods described herein.

The processor 204 may comprise or be a component of a processing system implemented with one or more electronic hardware processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location and/or device. The transmitter 210 and receiver 212 may be combined into a transceiver 214. A single or a plurality of transceiver antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. In some aspects, the wireless device may also include one or more of a user interface component 222, cellular modem 234, and a wireless LAN (WLAN) modem 238. The cellular modem 234 may provide for communication using cellular technologies, such as CDMA, GPRS, GSM, UTMS, or other cellular networking technology. The WLAN modem 238 may provide for communications using one or more Wi-Fi technologies, such as any of the IEEE 802.11 protocol standards.

The various components of the wireless device 202 may be coupled together by a bus system 226, which may include a power bus, a control signal bus, and a status signal bus in addition to a data bus.

Certain aspects of the present disclosure support transmitting an uplink (UL) signal 112 or a downlink (DL) signal 108 between one or more STAs 106 and an AP 104. In some embodiments, the signals may be transmitted in a multi-user MIMO (MU-MIMO) system. Alternatively, the signals may be transmitted in a multi-user FDMA (MU-FDMA) or similar FDMA system.

Figure 3:
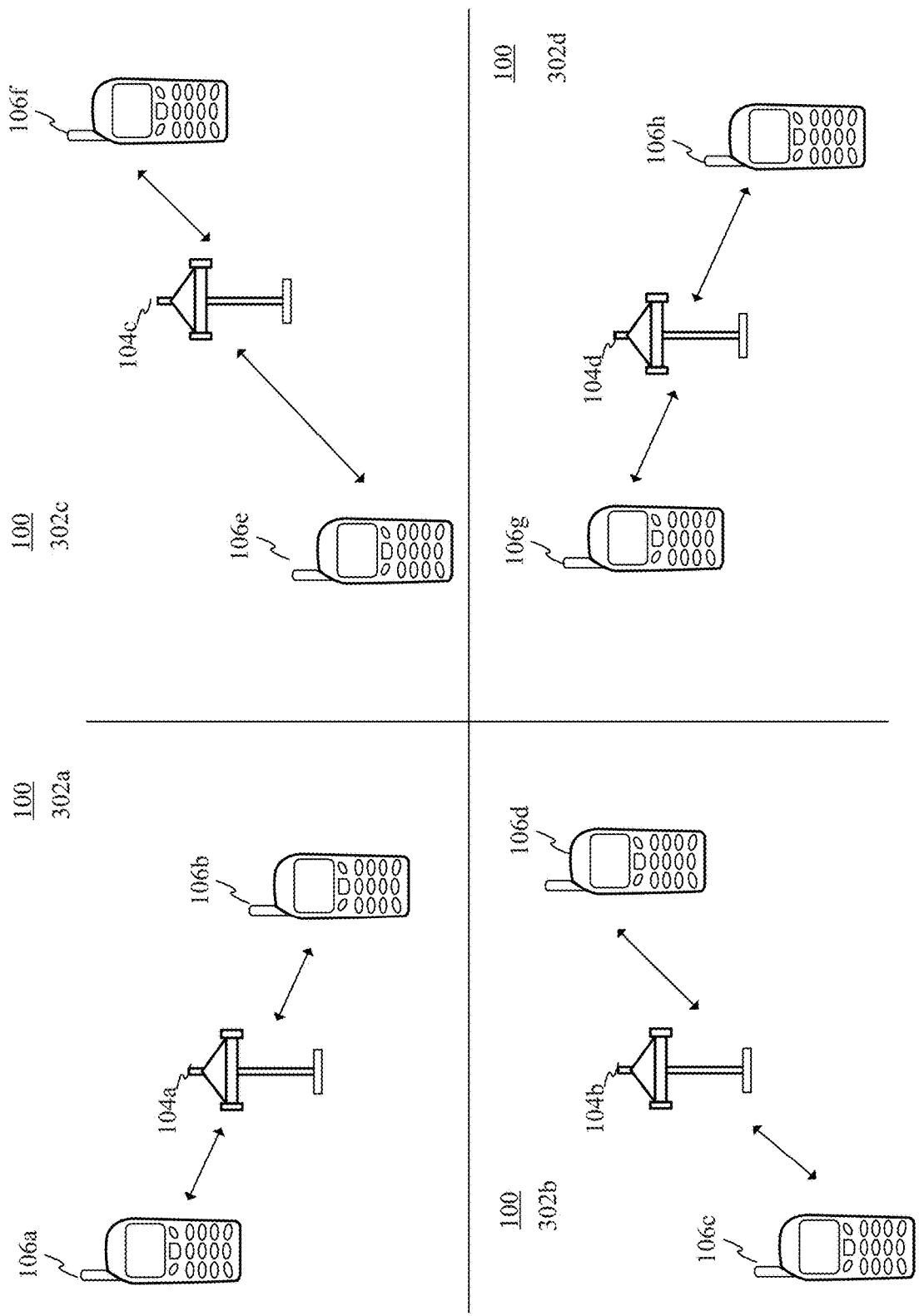
FIG. 3 schematically illustrates an example configuration of distributed neighboring communication systems in accordance with certain embodiments described herein.

FIG. 3 schematically illustrates an example configuration of distributed neighboring communication systems 302a-d in accordance with certain embodiments described herein. In some embodiments, each neighboring communication system 302a-d may comprise a basic service set (BSS). The BSSs 302a-d may each be a communication system 100 in close proximity with another communication system 100. Each access point 104a-d is associated with at least two stations within its respective BSS 302a-d. AP 104a is associated with STA 106a-b. AP 104b is associated with STA 106c-d. AP 104c is associated with STA 106e-f. AP 104d is associated with STAs 106g-h. An AP 104 that is associated with a STA 106 may be referred to as a BSS AP for the STA 106 throughout this disclosure. Similarly, an AP 104 for which there is no association with a particular STA 106 may be referred to as an OBSS AP for the STA 106 throughout this disclosure. Associations between an AP 104 and one or more STAs 106 provides for, in part, coordination of communication between devices within the BSS 302 defined by the AP 104 and its associated STAs 106. For example, devices within each BSS 302 may exchange signals with each other. The signals may function to coordinate transmissions from the respective AP 104a-d and stations within the AP's BSS 302a-d. In some embodiments, the APs. 104a-d may coordinate communication between the APs 104a-d.

The devices shown in FIG. 3, including the AP's 104a-d and STA 106a-h, may also share a wireless medium (e.g., one or more of the 2.4 GHz, 5 GHz, and 6 GHz channels). Sharing of the wireless medium is facilitated, in some aspects, via the use of carrier sense media access with collision detection (CSMA/CD). The disclosed embodiments may provide for a modified version of CSMA/CD that increases an ability for the BSSs 302a-d to communicate simultaneously when compared to known systems.

The stations 106a-h within the BSSs 302a-d may have different abilities to receive transmissions from their associated APs based, at least in part, on the positions of the STAs 106*a-h* relative to the other APs 104 and/or STAs 106 outside their respective BSS (OBSS). For example, because the STAs 106*a*, 106*c*, 106*f*, and 106*h* are positioned relatively far from OBSS APs, these stations may have an ability to receive transmissions from their respective BSS AP even with an OBSS AP or STA is transmitting. Stations having such receive characteristics may be referred to as Reuse STAs throughout this disclosure. Reuse STAs may have sufficient signal to noise ratios (SINRs) with OBSS APs that they may communicate with other STAs and/or APs without having to be nulled.

In contrast, STAs 106*b*, 106*e*, 106*f*, and 106*g* are illustrated in positions that are relatively close to an OBSS AP. Thus, these stations may have less ability to receive transmissions from their BSS AP during transmissions from OBSS AP's and/or OBSS STAs. Stations having such receive characteristics may be referred to as non-reuse or edge STAs throughout this disclosure. Non-reuse STAs may have insufficient signal to noise ratios (SINRs) with OBSS APs that they may must be nulled to communicate with other STAs and/or APs while communications are occurring involving the OBSS APs. In some aspects, the disclosed methods and systems may provide for an improved ability for the non-reuse STAs to communicate concurrently while other OBSS devices are also communicating on the wireless medium.

In at least some of the disclosed aspects, two or more of the APs 104*a-d* may negotiate to form a cluster of access points. In other aspects, cluster configurations may be defined via manual configuration. For example, each AP may maintain configuration parameters indicating whether the AP is part of one or more cluster, and if so, a cluster identifier for the cluster. In some aspects, the configuration may also indicate whether the AP is a cluster controller for the cluster. In some of the embodiments disclosed herein, a cluster controller may take on functions that differ from APs that are part of the cluster but are not a cluster controller. Thus, in some aspects, two or more of APs 104*a-d* may be included in the same cluster. STAs associated with those access points may also be considered to be included in or part of the cluster of their associated AP. Therefore, in some aspects the STAs 106*a-h* illustrated above may be part of the same cluster.

The cluster of access points may coordinate transmissions between themselves and their associated APs. In some aspects, the cluster may be identified via a cluster identifier that uniquely identifies the group of access points comprising the cluster. In some aspects, during association of a station with any of the APs in a cluster, the cluster identifier is transmitted to the station during association, for example, in an association response message. The station may then utilize the cluster identifier to coordinate communications within the cluster. For example, one or more messages transmitted over the wireless network may include the cluster identifier, which a receiving STA may use to determine whether the message is addressed to it or not.

In certain embodiments cluster access points may also utilize various methods to identify STAs within the cluster. For example, as known methods of generating association identifiers (AIDs) may not provide uniqueness across access points, in some aspects, media access control (MAC) addresses may be utilized to identify stations where appropriate. For example, known messages including user info fields that utilize association identifiers to identify stations may be modified to contain data derived from station MAC addresses in the disclosed embodiments. Alternatively, methods of generating association identifiers may be modified to ensure uniqueness within a cluster of access points. For example, a portion of the association identifier may uniquely identify an access point within the cluster. Stations associated with that access point would be assigned association identifiers including the unique identification. This provides unique association identifiers across access points within a cluster. In some other aspects, an association identifier within a cluster may include the cluster identifier. This may provide for uniqueness across clusters to facilitate future cross-cluster coordination of communication.

As more devices begin communicating on wireless networks, additional frequency communication bands and networks (e.g., 6 GHz) may be implemented supporting high bandwidth and high throughput messaging services. However, when beacons, probe requests/responses, and acknowledgements are communicated on the additional frequency channels, the throughput capabilities of the additional frequency channels are greatly decreased due to the increased overhead. Uncontrolled communications on the second channel may pollute the channel and lead to significant inefficiencies in a dense network (e.g., when multiple devices communicate over the channel).

Accordingly, limiting uncontrolled communications on a frequency channel by STAs and APs may be desired, which may lead to more efficient channel access of the frequency channel. In some embodiments, other frequency channels (e.g., 2.4 GHz or 5 GHz) may be used for the communication and/or scheduling of beacons, probe requests/responses, acknowledgements, and similar communications. Offloading these and similar communications may reduce "pollution" or the uncontrolled communications on the frequency channel and generally increase the availability of the frequency channel for high bandwidth and high throughput communications.

One or more of the APs 104 as shown in FIG. 3 may be dual radio APs, which generally means that these APs 104 operate on a plurality of frequency channels. For example, the AP 104*a* may be a dual radio AP that operates on the first (2.4 GHz) and second (6 GHz) frequency channels.

In some embodiments, the APs 104 that communicate on the second frequency channel may be tasked with controlling access to the second frequency channel by non-AP STAs (e.g., STAs 106). For example, the APs 104 may schedule the STAs 106 access to the second frequency channel. For example, the STA 106 that desires to connect to the second frequency channel may obtain scheduling information from its associated AP 104 prior to accessing or associating with the second frequency channel. Various mechanisms may be used to schedule the STA 106 access to the second frequency channel. For example, a trigger based approach may involve the STA 106 responding to trigger frames sent by the AP 104. Accordingly, the STA 106 would only access the second frequency channel after receiving a corresponding trigger frame from the AP 104. Alternatively, the APs 104 controlling access to the second frequency channel may allow single user (SU) access by STAs 106. For example, the APs 104 may permit the STA 106 to use enhanced distributed channel access (EDCA) based SU access during services periods (SPs) scheduled by the APs 104. The SU access option or mode may help devices that are not associated with or not receiving trigger frames from the APs 104. The SU access option may also provide for association signaling. An EDCA count-down may only occur during the SU service period.

In some embodiments, one or more STAs 106 is unable to perform association with the second frequency channel using another frequency channel or using any other means or method. Accordingly, the AP 104 may temporarily enable EDCA access if the STA 106 is unable to associate over another frequency channel (for example, via OCT) or does not support responding to a trigger frame (TF) with random access resource units (RA-RUs). In some embodiments, the AP 104 temporarily enables EDCA if the AP 104 itself does not support transmitting TF with RA-RUs or association via OCT. The AP 104 may indicate temporary enablement via one or more management frames (such as beacons, FD frames, broadcast probe response frames).

Channel access rules may also apply to active scanning used for discovery and roaming and may also be controlled by the APs 104. For example, STAs 106 not associated with any particular AP 104 may generally use active scanning in network discovery to identify networks to which the STAs 106 can connect. Additionally, STAs 106 associated with an AP 104 may use active scanning to identify an AP 104 that is "better" than the currently associated AP 104, such as when the STA 106 is moving or roaming.

Many APs 104, as described above, may provide concurrent support for the multiple frequency channels. For example, the APs 104 provide concurrent support for a plurality of 2.4 GHz, 5 GHz, and 6 GHz frequency channels. The APs 104 utilize large beacon intervals (e.g., periods between successive beacons) on the second frequency channels as compared to the first frequency channels to reduce beacon pollution in the second frequency channels. Additionally, a fast initial link setup (FILS) discovery frame or beacon may be communicated more often on the second frequency channel to allow AP 104 discovery by STAs 106 on the second frequency channel. The FILS discovery frame may include less information than a general beacon frame. The FILS discovery frame communicated more often with less information may reduce AP 104 discovery times by the STAs 106.

Various options may exist for controlling channel access to (e.g., prohibiting uncontrolled communications on) second frequency channels (e.g., the 6 GHz channel). In some aspects, EDCA based SU access by STAs 106 for sending probe requests may be discouraged so as to prevent possible probe-storms that may occur when STAs 106 have uncontrolled SU access to a channel. In some aspects, a first frequency channel(s) (e.g., the 2.4 GHz/5 GHz channels) may be used for discovery of a second frequency channel(s) (e.g., the 6 GHz channel) while the second frequency channel is still used for roaming discovery when certain conditions are met.

In a first aspect, the STAs 106 may be capable of communicating on both the first frequency channels and the second frequency channel and may use the first frequency channels (e.g., the 2.4/5 GHz channels) for obtaining information about accessing or associating with the second frequency channel (e.g., the 6 GHz channel). The STA 106 that is associated with the first frequency channels may send a probe request to the AP 104 that communicates on the first frequency channels. The STA 106 will receive a probe response from the AP 104 on the first frequency channel that includes a neighbor report for the second frequency channel. The neighbor report may include information regarding or relating to at least one of an operating class, a channel number, a BSSID, a SSID, etc., of the AP 104 communicating on the second frequency channel. In some aspects, one or more of this information may not be included, or additional information may be included, in the neighbor report. The STA 106 may then use passive scanning on the second frequency channel based on the information received in the neighbor report to obtain the beacon communicated on the second frequency channel. However, since the beacons on the second frequency channel are transmitted at different intervals than beacons on the first frequency channels, the STA 106 may spend long durations of time in the passive scanning windows awaiting the second frequency channel beacon.

In some embodiments, an AP 104 indicates whether EDCA based pre-association signaling is allowed or not. A pre-association signaling communication may include any management frame sent by a STA 106 prior to association of the STA 106 and the AP 104, such as a probe request, association request, authentication request, etc. In some embodiments, the AP 104 indicates during discovery whether or not pre-association signaling is permitted. For example, discovery frames for a secondary channel as communicated over or on primary channels (such as probe responses in 2.4/5 GHz frequency channels) or FILS discovery frames in the 6 GHz frequency channel or a neighbor report element may indicate whether or not the pre-association signaling is allowed. In some embodiments, if EDCA access is not permitted, then on-channel tunneling (OCT) may be used for association of the STA 106 with the AP 104 on the 6 GHz frequency channel. Such OCT may include using the collocated 2.4/5 GHz radio to obtain necessary information for the 6 GHz channel. Thus, the STA 106 may associated with the 6 GHz channel of the AP 104 on the 2.4/5 GHz channel before switching over to the 6 GHz channel for communication. In some embodiments, the OCT is performed at the MAC sublayer management entity (MLME) level. The OCT may enable the STA 106 of a multi-band capable device to transmit any management frame that was constructed by a different STA of the same device. If EDCA is allowed, association may proceed using EDCA communications. In some embodiments, STAs 106 looking to communicate on 6 GHz frequency bands may support OCT. Additionally, APs 104 that only support communications on the 6 GHz frequency band may be unable to disable pre-association EDCA access by STAs 106.

In some embodiments, trigger based random access may be used for association of the STA 106 with the 6 GHz channel.

Figure 4:
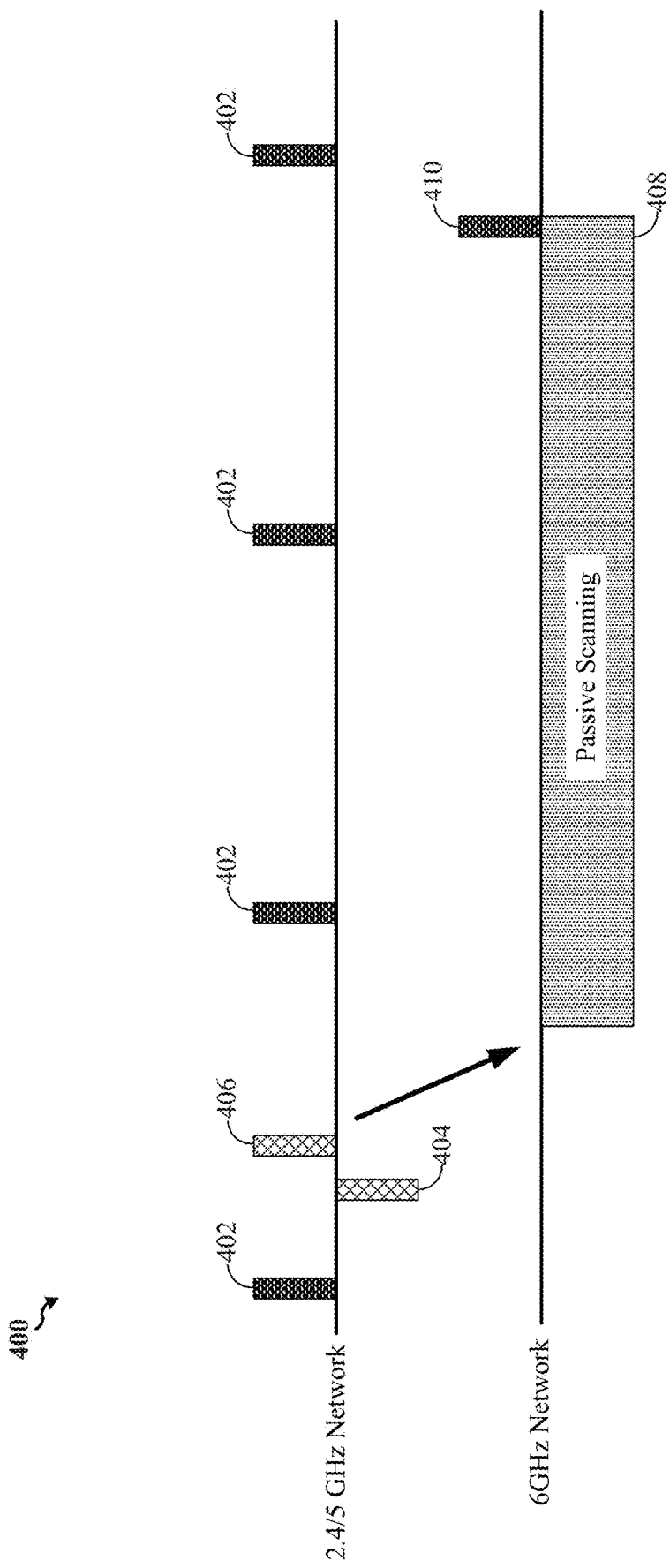
FIG. 4 illustrates an exemplary communications diagram including communications exchanged with a STA communicating between two communication bands, in accordance with certain embodiments described herein.

FIG. 4 illustrates an exemplary communications diagram 400 including communications exchanged with a STA 106 communicating between two communication bands, in accordance with certain embodiments described herein. The STA 106 may receive and transmit communications on a first frequency network or channel (e.g., a 2.4/5 GHz network) and a second frequency network or channel (e.g., a 6 GHz network). Other frequencies of networks may be applicable as well.

As discussed herein, the STA 106 may receive or otherwise observe a beacon 402 that is communicated at periodic intervals on the 2.4/5 GHz network. The STA 106, which is associated with an AP 104a communicating on the 2.4/5 GHz network, may then transmit a probe request 404 to the AP 104a. In some aspects, the probe request may specifically request information regarding an AP 104b operating on the 6 GHz network, such as channel number, BSSID, etc. In response to the probe request, the STA 106 may receive a probe response 406 from the AP 104a that includes neighbor report information as described herein. Based on this received probe response 406 and included neighbor information, the STA 106 may then passively scan the 6 GHz network (for a period of time 408) until a beacon 410 is observed on the 6 GHz network. While the STA 106 will obtain the beacon 410 according to this description, the amount of time spent in passively scanning may increase power consumption for the STA 106, and may otherwise be inefficient (e.g., unable to perform any communications on other networks during such periods). For STAs 106 that are roaming in the 6 GHz network, the STAs 106 may obtain the information regarding the 6 GHz network from the 6 GHz AP 104*b* directly; however, the extended duration of passive scanning may lead to long off-channel times and cause interruptions to active traffic for the STA 106. Thus, the communications according to FIG. 4 may decrease pollution on the 6 GHz network as compared to allowing uncontrolled access but reduce overall communication efficiencies of STAs 106 looking to communicate on the 6 GHz network.

In a second aspect, the STAs 106 may also be capable of communicating on both the first frequency channels and the second frequency channels and may use the first frequency channels (e.g., the 2.4/5 GHz channels) for obtaining information about accessing or associating with the second frequency channel (e.g., the 6 GHz channel). As noted above, the STA 106 that is associated with the first frequency channels may send a probe request to the AP 104 that communicates on the first frequency channels. The STA 106 will receive a probe response from the AP 104 that includes a neighbor report information element (or other information element or message) that includes information for the second frequency channel. The neighbor report may include information such as a target beacon transmission time (TBTT) offset, a channel number, a BSSID, a SSID, etc., of the AP 104 communicating on the second frequency channel. In some aspects, one or more of this information may not be included, or additional information may be included, in the neighbor report. The STA 106 may then passively scan the second frequency channel based on the information received in the neighbor report to obtain the beacon communicated on the second frequency channel. However, the STA 106 may use the TBTT offset to better predict when to expect the beacon on the second frequency channel and may reduce the period of passive scanning accordingly.

In some embodiments, the AP 104 may indicate, during association, whether or not EDCA based access is allowed during post-association communications. Post-association access frames may include any frame including quality of service (QoS) data frames that are sent after association. In some embodiments, the AP 104 indicates whether post-association EDCA access is allowed. If it is allowed, then multiple options may be possible, including probe response, association responses, and so forth.

In some embodiments, if EDCA is allowed, then EDCA access may be performed by the STA 106. If EDCA access is not allowed, then the AP 104 and/or the STA 106 may use trigger based scheduling. For example, directed trigger based scheduling may be used, which includes indication of the destination of the trigger. Accordingly, the AP 104 may send a trigger to a particular STA 106 and the STA 106 may communicate based on receiving a trigger directed to the STA 106. In such a system, the STA 106 may support trigger based access in addition to EDCA based access, while the AP 104 may optionally support fully scheduled access.

In some embodiments, transmit power controls may exist for the APs 104. For example, APs 104 may have maximum transmit power thresholds or limits that are mandated. In some embodiments, BSS sizes may be based on network density needs and the maximum transmit power thresholds or limits. In some embodiments, the AP 104 sets a maximum transmit power permitted by STAs 106, for example using a power constraint information element or similar element. The AP 104 may include the power constraint information element in beacons, probe responses, and any other transmission by the AP 104. In some embodiments, the STA 106 obtains transmit power control (TPC) information for a 6 GHz channel from a co-located 2.4/5 GHz AP as part of an initial active scan. Post-discovery, the STA 106 may use the TPC information received from the 6 GHz AP in management frames. The TPC information may be used in selection and/or adaptation to control BSS range and mitigate interference, among other benefits.

Figure 5:
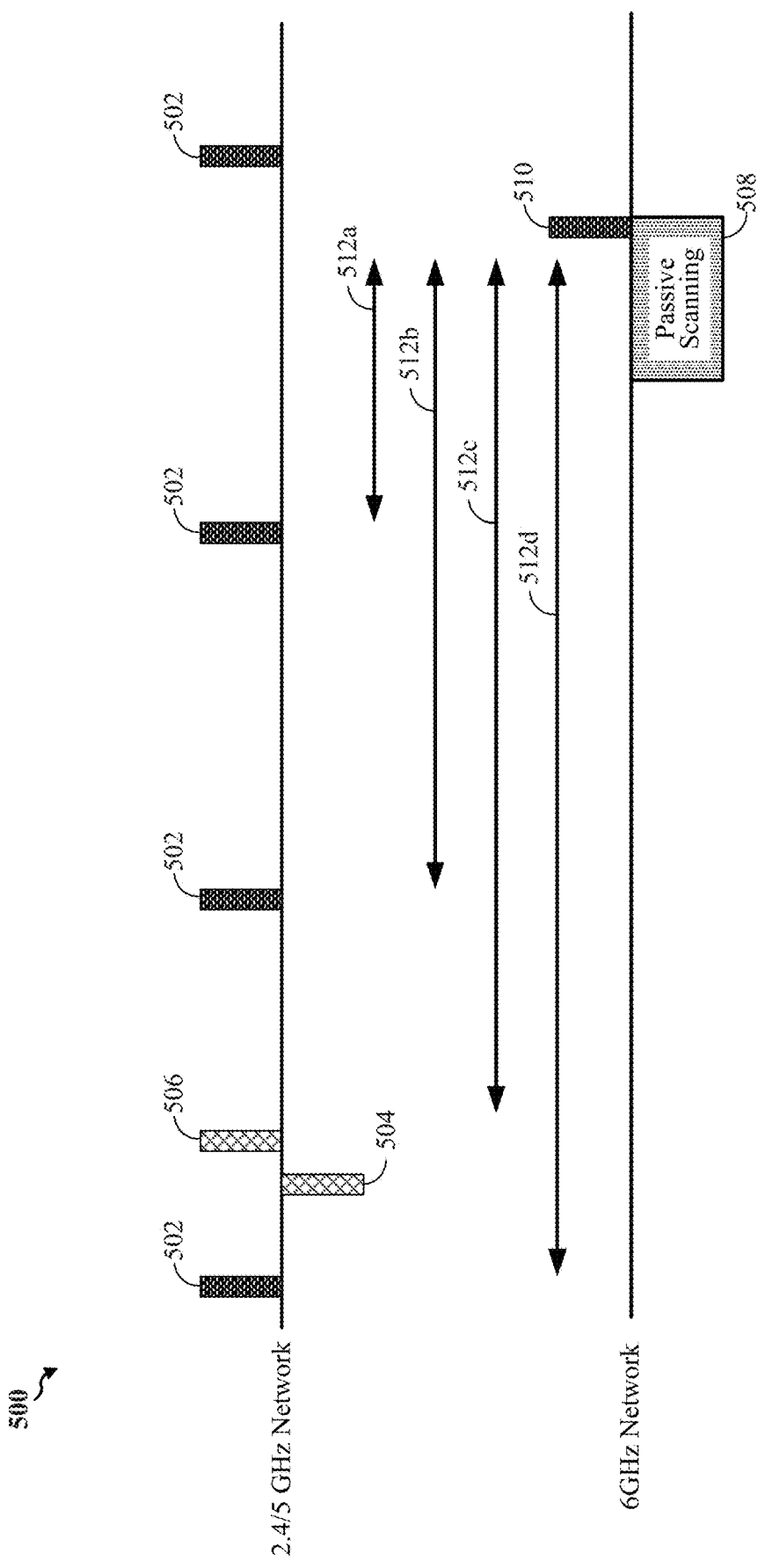
FIG. 5 illustrates an exemplary communications diagram including communications exchanged between the STA communicating between the two communication bands, in accordance with certain embodiments described herein.

FIG. 5 illustrates an exemplary communications diagram 500 including communications exchanged between the STA communicating between the two communication bands, in accordance with certain embodiments described herein. The STA 106 may receive and transmit communications on a first frequency network or channel (e.g., a 2.4/5 GHz network) and a second frequency network or channel (e.g., a 6 GHz network). Other frequencies of networks may be applicable as well.

As discussed herein, the STA 106 may receive or otherwise observe a beacon 502 that is communicated at periodic intervals on the 2.4/5 GHz network. The STA 106, which is associated with an AP 104*a* communicating on the 2.4/5 GHz network, may then transmit a probe request 504 to the AP 104*a*. In some aspects, the probe request may specifically request information regarding an AP 104*b* operating on the 6 GHz network, such as channel number, BSSID, etc. In response to the probe request, the STA 106 may receive a probe response 506 from the AP 104*a* that includes a neighbor report information element (or similar structure) that includes various information regarding the AP 104*b*, as described herein. Based on this received probe response 506 and included neighbor report information, the STA 106 may then passively scan the 6 GHz network (for a period of time 508) until a beacon 510 is observed on the 6 GHz network. However, since the received probe response 506 includes the TBTT offset as described herein, the STA 106 may better predict when to passively scan the 6 GHz network for the beacon 510. In some embodiments, the TBTT offset may include the information regarding the amount of time from the communication of the probe response 506 to the beacon 510 (e.g., the TBTT period 512*c*). Alternatively, or additionally, the probe response 506 may include information regarding the TBTT offsets from other beacons communicated on the 2.4/5 GHz network and the beacon 510 on the 6 GHz network (e.g., the TBTT periods 512*a*, 512*b*, and 512*d*). Since the STA 106, as compared to the STA 106 in FIG. 4, will obtain the beacon 510 according to this description with less time spent passively scanning, the communication diagram 500 may provide for reduced power consumption for the STA 106 and improved communication efficiencies for the STA 106. Since STAs 106 that are roaming in the 6 GHz network obtain the information regarding the 6 GHz network from the 6 GHz AP 104*b* directly, the reduced passive scanning reduces off-channel times and interrupts as compared to FIG. 4. However, latencies for roaming may be higher than desirable. In some aspects, if the AP 104*a* fails to provide the neighbor report IE (or similar structure), the STA 106 may fall back to the procedures described in relation to FIG. 4 to establish communications on the 6 GHz network. Accordingly, the communications according to FIG. 5 may reduce pollution on the 6 GHz network while improving overall communication efficiencies of STAs 106 looking to communicate on the 6 GHz network, at least as compared to the communications diagram 400 of FIG. 4.

In some embodiments, the TBTT indicates a target time at which or when a subsequent or next beacon is expected to be transmitted and/or received. By receiving the beacon from the 6 GHz BSS, the STA 106 may gather all necessary information regarding the operating configuration of the AP 104 on the 6 GHz band. Therefore, the STA 106 may avoid sending a probe request frame on the 6 GHz band, thereby enabling passive scanning and avoiding active scanning.

In a third aspect, the STAs 106 may communicate on both the first frequency channels and the second frequency channels and may use the first frequency channels (e.g., the 2.4/5 GHz channels) for obtaining information about accessing or associating with the second frequency channel (e.g., the 6 GHz channel). As noted above, the STA 106 that is associated with the first frequency channels may send a probe request to the AP 104 that communicates on the first frequency channels. The STA 106 will receive a probe response from the AP 104 that includes an information element (or other message or frame) that includes information for the second frequency channel. The information element may include information such a target wake time (TWT) offset, a channel number, a BSSID, a SSID, etc., of the AP 104 communicating on the second frequency channel. The TWT offset may provide an offset based on which the STA 106 may identify a TWT service period (SP) during which the STA 106 may communicate with the AP 104 of the second frequency channel over the second frequency channel. In some aspects, one or more of this information may not be included, or additional information may be included, in the neighbor report. The STA 106 may then send a probe request to the AP 104 over the second frequency channel during the identified TWT SP. The STA 106 may use controlled SU EDCA access to send the probe request over the second frequency channel if the TWT SP permits EDCA. If the TWT SP is instead trigger enabled, the STA 106 may use random access for transmitting the probe request over the second frequency channel. Accordingly, the STA 106 may use the TWT SP offset to identify periods or windows during which the STA 106 can communicate with the AP 104 of the second frequency channel and may thus eliminate periods of passive scanning.

Figure 6:
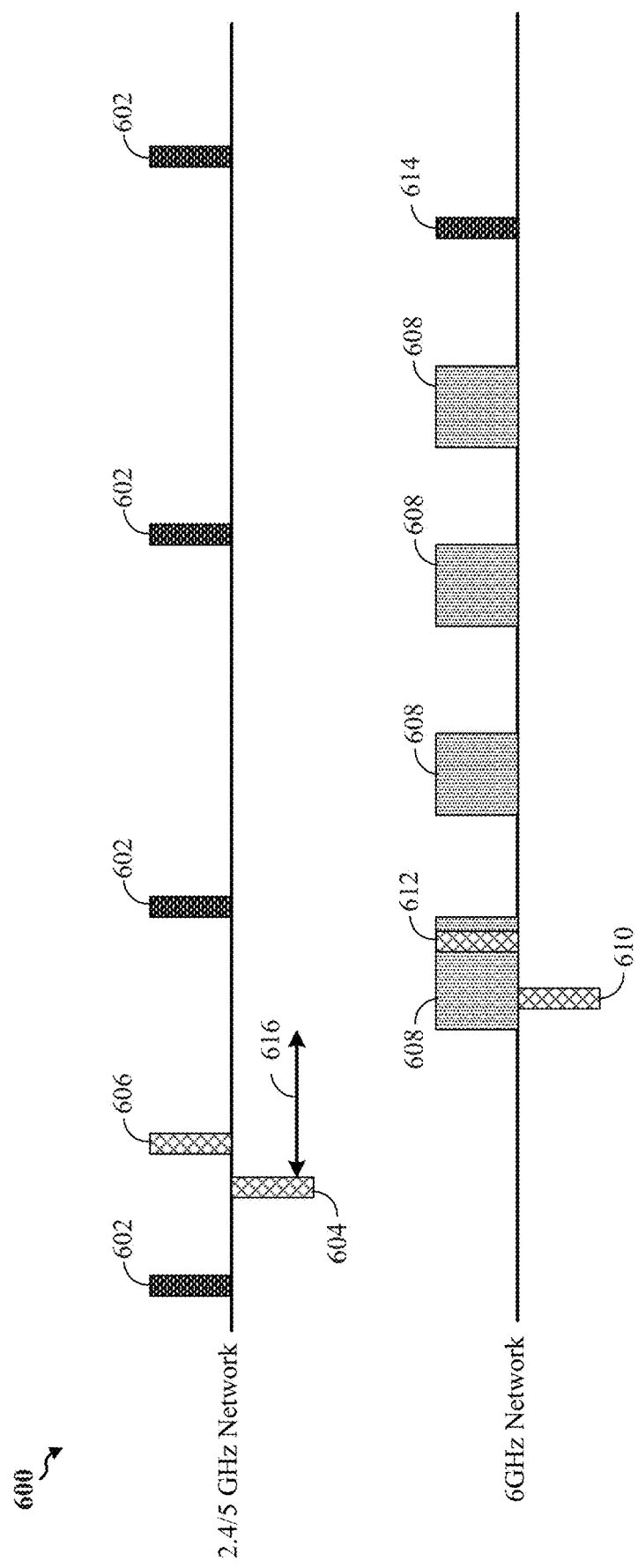
FIG. 6 illustrates an exemplary communications diagram including communications exchanged between the STA communicating between the two communication bands, in accordance with certain embodiments described herein.

FIG. 6 illustrates an exemplary communications diagram 600 including communications exchanged between the STA communicating between the two communication bands, in accordance with certain embodiments described herein. The STA 106 may receive and transmit communications on a first frequency network or channel (e.g., a 2.4/5 GHz network) and a second frequency network or channel (e.g., a 6 GHz network). Other frequencies of networks may be applicable as well.

As discussed herein, the STA 106 may receive or otherwise observe a beacon 602 that is communicated at periodic intervals on the 2.4/5 GHz network. The STA 106, which is associated with an AP 104*a* communicating on the 2.4/5 GHz network, may then transmit a probe request 604 to the AP 104*a*. In some aspects, the probe request may specifically request information regarding an AP 104*b* operating on the 6 GHz network, such as channel number, BSSID, etc. In response to the probe request, the STA 106 may receive a probe response 606 from the AP 104*a* that includes an information element (or similar structure) that includes various information regarding the AP 104*b*, as described herein. Based on this received probe response 606 and included information element (detailing the TWT offset as described herein), the STA 106 may then identify a TWT service period (SP) 608 of the 6 GHz network. In some embodiments, the TWT offset may include the information regarding the amount of time from the communication of the probe response 606 to the TWT SP 608. Alternatively, or additionally, the probe response 606 may include information regarding the TWT offsets 616 for other TWT SPs 608. During the TWT SP 608, the STA 106 may transmit a probe request 610 to the AP 104*b* and receive a probe response 612 from the AP 104*b*. The STA 106 will then obtain the beacon 614 according to the information received from the AP 104*b* in the probe response 612. Thus, the STA 106 spends minimal time passively scanning. The communication diagram 600 may provide for reduced power consumption for the STA 106 and improved communication efficiencies for the STA 106 as compared to the communication diagrams 400 and 500 for FIGS. 4 and 5, respectively. Since STAs 106 that are roaming in the 6 GHz network obtain the information regarding the 6 GHz network from the 6 GHz AP 104*b* directly, the reduced passive scanning reduces off-channel times and reduced interrupts as compared to FIGS. 4 and 5. Furthermore, latencies for roaming that may be higher than desirable in the communication diagram 500 may be further reduced (for example, via neighborhood learning). In some aspects, if the AP 104*a* fails to provide the neighbor report IE (or similar structure), the STA 106 may fall back to the procedures described in relation to FIGS. 4 and/or 5 to establish communications on the 6 GHz network. Accordingly, the communications according to FIG. 6 may reduce pollution on the 6 GHz network while improving overall communication efficiencies of STAs 106 looking to communicate on the 6 GHz network, at least as compared to the communications diagrams 400 and 500 of FIGS. 4 and 5, respectively.

In some aspects, neighborhood learning may be utilized to improve STA 106 roaming in second frequency channels. Neighborhood learning may occur when APs 104 read beacons that are transmitted by other APs 104. By reading these beacons, the APs 104 may obtain information regarding each of their neighboring APs. This may be permissible because the APs 104 fully control channel accesses by the non-AP STAs 106. Accordingly, the APs 104 may switch between channels and/or networks without worry of missing communications because the APs 104 have scheduled their communications and can ensure to be back on the proper channel/network for those scheduled communications.

In some aspects, neighborhood learning may utilize 11*k* signaling. 11*k* signaling may allow APs 104 to collect neighboring AP information even when the APs 104 are hidden from each other. The 11*k* signaling may allow neighboring APs 104 to obtain TWT information for each other. The 11*k* signaling may comprise beacon reporting, where an AP 104 is configured (e.g., by a central controller or controlling AP 104) to include neighborhood information or to scan for beacons for neighboring APs 104 or otherwise learn or gather neighborhood information via an 11*k* beacon report. Such information may be obtained via any mechanism that allows an AP 104 to request associated STAs 106 to provide information or reports regarding a neighborhood (e.g., neighboring APs 104). In some embodiments, this mechanism may be part of a radio measurement request/report framework and may provide for beacon requesting and reporting. Such framework and/or mechanism may provide a wide variety of options for requesting information and what information to request. For example, the requesting AP 104 may include a combination of requests into a single request. The requesting AP 104 may obtain the requested information via either passive or active scanning (or a combination thereof) of the neighborhood and may request all fixed length and/or specific elements (e.g., elements reported in neighbor request elements or messages as described herein), all fixed length fields, etc. The requesting AP 104 may also indicate how often such reports should be provided to the requesting AP 104 and/or a trigger/threshold limit based on which the report will be generated.

Figure 7:
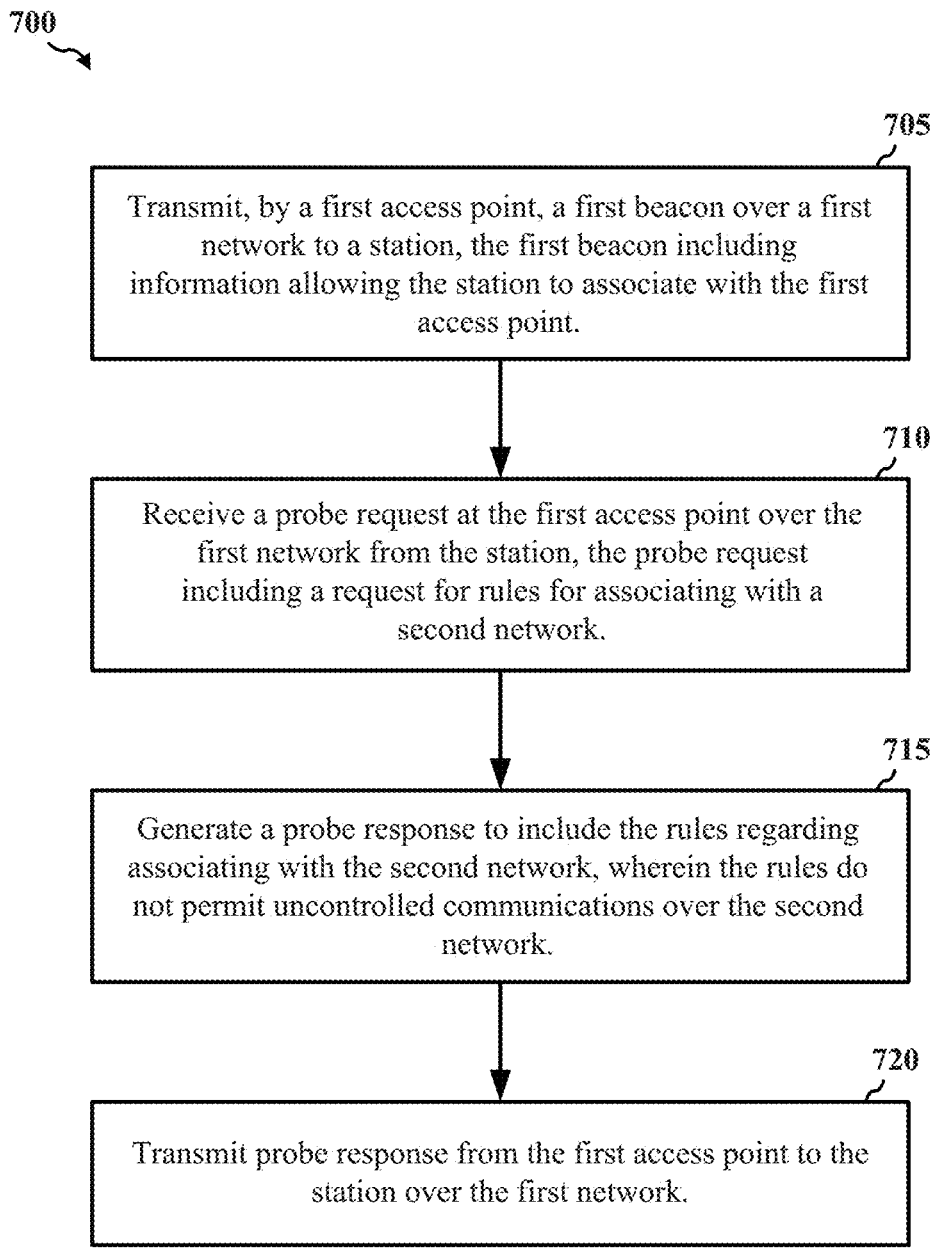
FIG. 7 depicts a method for controlling network access, in accordance with certain embodiments described herein.

FIG. 7 depicts a method 700 for controlling network access, in accordance with certain embodiments described herein. In some aspects, the method 700 discussed below with respect to FIG. 7 may be performed by the wireless device 202. For example, in some aspects, the memory 206 may store instructions that configure the processor 204 to perform one or more of the functions discussed below with respect to FIG. 7. In some embodiments, the method 700 may be performed by the AP 104 of FIG. 1.

In block 705, a first beacon is transmitted over a first network to a station. The first beacon may include information regarding the first network and/or permitting the station to associate with the AP 104 that transmitted the first beacon if the station is not already associated with the AP 104. The first beacon may be transmitted for consumption by STAs 106 or other APs 104. At block 710, the AP 104 receives a probe request from the STA 106 over the first network. The probe request may include a request for access rules for accessing or associating with a second access point and/or a second network. In some aspects, the probe request may request particular access rules and/or information or may be a general request for access rules and/or information.

At block 715, the AP 104 generates a probe response to include the access rules regarding accessing or associating with the second access point and/or the second network. In some embodiments, the rules do not permit uncontrolled communications over the second network and/or with the second access point. The generated probe response may include access rules comprising at least one of permitted passive scanning of the second network by the station, permitted passive scanning of the second network based on a target beacon transmission time (TBTT) offset, and permitted active scanning of the second network based on a target wake time (TWT) offset associated with the second network. At block 720, the AP 104 transmits the generated probe response to the station over the first network. The access rules and information included in the probe response may not permit uncontrolled communications over the second network by the station.

Figure 8:
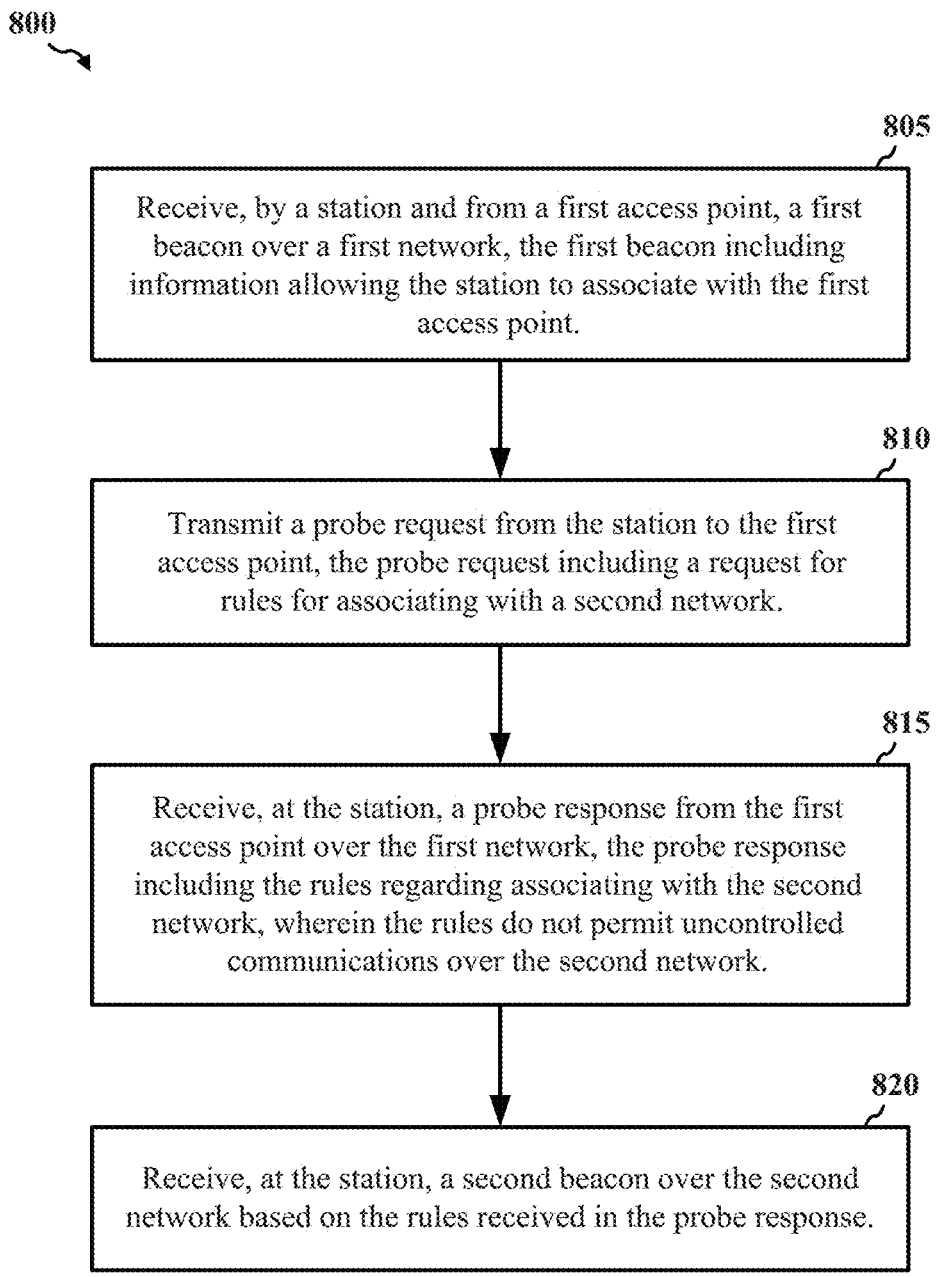
FIG. 8 depicts a method for accessing networks, in accordance with certain embodiments described herein.

FIG. 8 depicts a method 800 for accessing or associating with networks, in accordance with certain embodiments described herein. In some aspects, the method 800 discussed below with respect to FIG. 8 may be performed by the wireless device 202. For example, in some aspects, the memory 206 may store instructions that configure the processor 204 to perform one or more of the functions discussed below with respect to FIG. 8. In some embodiments, the method 800 may be performed by the STA 106 of FIG. 1.

In block 805, a first beacon is received over a first network by a STA 106. The first beacon may include information regarding the first network and/or permitting the station to associate with the AP 104 that transmitted the first beacon if the station is not already associated with the AP 104. The first beacon may be transmitted for consumption by STAs 106 or other APs 104. At block 810, the STA 106 transmits a probe request from the station to the first access point. The probe request may include a request for access rules for accessing or associating with a second access point and/or a second network. In some aspects, the probe request may request particular access rules and/or information or may be a general request for access rules and/or information.

At block 815, the STA 106 receives a probe response from the first access point over the first network, the probe response including the rules regarding accessing or associating with the second network, wherein the rules do not permit uncontrolled communications over the second network. The generated probe response may include at least one of details of permitted passive scanning of the second network by the station, permitted passive scanning of the second network based on a target beacon transmission time (TBTT) offset, and permitted active scanning of the second network based on a target wake time (TWT) offset associated with the second network. At block 820, based on the access rules and/or information received in the probe response, the STA 106 receives a second beacon over the second network based on the rules received in the probe response. The STA 106 may not be permitted to generating or transmitting any uncontrolled communications over the second network by the station.

In some embodiments, fast passive scanning is permitted on the 6 GHz frequency band. Such fast passive scanning may utilize FILS discovery frames and limit blind active scanning. For example, a FILS discovery frame may be sent by the AP 104 every 20 ms, based on Wi-Fi Alliance Optimized Connectivity Experience (WFA OCE) However, such FILS discovery frames may cause the following issues:

20 ms is slow, and sending FD frames more often reduces medium efficiency

FILS discovery frames may be sent using 20 MHz SU PPDUs, resulting in wastage of secondary channels In some embodiments, the AP 104 transmits one or more FILS discovery frames on a primary channel or on a discovery channel on the 6 GHz (or second channel) band to help STAs 106 discovery the AP 104 communicating on the 6 GHz band via passive scanning. The discovery channel may be the same as the primary channel. The FILS discovery frame may include enough information to instruct the STAs about (1) whether unsolicited probing is permitted or not (for example, whether EDCA based SU frames are allowed or not) and, (2) if not, whether there are time blocks (for example, TWT SPs) when unsolicited access is allowed on the 6 GHz channel, or (3) whether the AP 104 transmits Trigger frames with random access (RA) resource units (RUs) for the STA 106 to send management frames to the AP 104. In some embodiments, the FILS discovery frame provides indication regarding the next TBTT.

In some embodiments, the STA 106, upon receiving FD frames, follows the access rules and/or decides to defer any probe request, instead catching or waiting for and receiving a subsequent beacon (based on the indicated TBTT). In some embodiments, the FILS discovery frame is communicated on the 6 GHz channel (i.e., the second network).

To overcome such issues, the AP 104 operating in the 6 GHz band can send FILS discovery frames more often with minimal impact on the medium efficiency. For example, the FILS discovery frame may be sent by the AP 104 using a broadcast RU in a HE MU PPDU, while serving other STAs in other RUs. Additionally, the FILS discovery frame may carry neighboring AP information to speedup discovery of other APs 104 by the STA 106.

In some embodiments, defining one or more discovery channels for the 6 GHz frequency band may reduce scanning latency. By establishing dedicated discovery channels, the STA 106 would reduce lost time spent scanning non-discovery channels in the 6 GHz band. If there are many channels in the 6 GHz band, scanning each of the channels can be burdensome, so limiting scanning to a subset of 6 GHz channels (the discovery channels) would improve efficiency and reduce scanning latency. In some embodiments, the discovery channel may permit active or passive scanning. For example, based on the access rules, the STA 106 may perform active scanning on the discovery channel or perform passive scanning by listening for FILS discovery frames on the discovery channel.

In some embodiments, a high efficiency (HE) physical layer (PHY) capabilities information field or element (not shown herein) includes one or more fields that indicate whether the STA 106 or the AP 104 transmitting the HE PHY capabilities information field supports 6 GHz operation or communications. Specifically, the HE PHY capabilities information field transmitted by the HE STA 106 or the HE AP 104 may include a 6 GHz support field having a length of one or more bits. A value of "0" may indicate that 6 GHz operation and/or communication is not supported by the transmitting device while a value of "1" may indicates that 6 GHz operation and/or communication is supported by the transmitting device.

In some embodiments, a HE media access control (MAC) capabilities information field or element includes one or more fields that indicate different information dependent on the source of the HE MAC capabilities information field. Specifically, the HE MAC capabilities information element transmitted by the HE STA 106 or the HE AP 104 may include an EDCA disabled support field having a length of one or more bits. When the non-AP HE STA 106 transmits the HE MAC capabilities information field, a value of "0" may indicate that the non-AP HE STA 106 does not support disabled EDCA operation in the 6 GHz frequency channel, while a value of "1" indicates support for disabled EDCA operation in the 6 GHz frequency channel. When the HE AP 104 transmits the HE MAC capabilities information field, a value of "0" may indicate that the HE AP 104 does not support disabling EDCA operation in the 6 GHz frequency channel, while a value of "1" indicates support for disabling EDCA operation in the 6 GHz frequency channel.

Figures 9, 10:
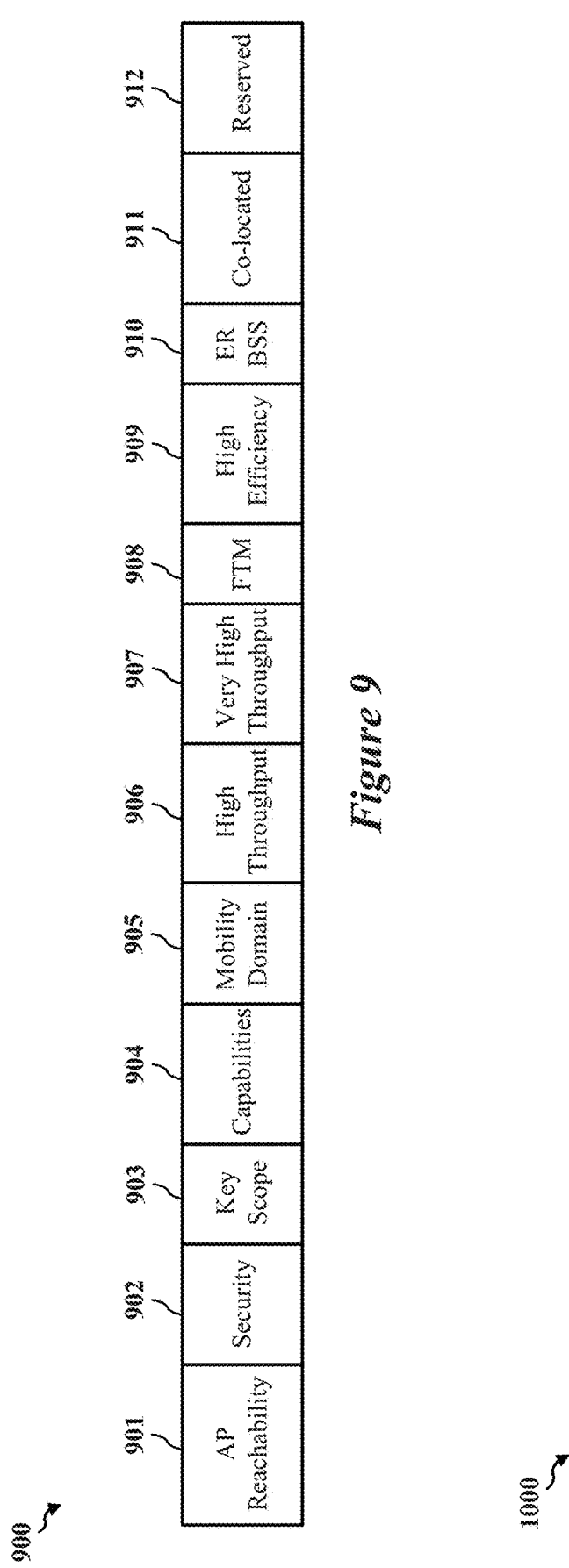
FIG. 9 illustrates an exemplary neighbor report information element 900 for communication in the wireless communication systems described herein.
FIG. 10 illustrates an exemplary high-efficiency (HE) operation element for communication in the wireless communication systems described herein.

An HE operation element may also include one or more fields relevant to 6 GHz frequency channel support or operations for one or more of the HE AP 104 and the HE STA 106. In some embodiments, the HE operation element may be used to identify or otherwise advertise 6 GHz support by the device transmitting the HE operation element. For example, the HE operation element may include a 6 GHz operation information field having a length of one or more bits. When communicated by the HE AP 104, the 6 GHz operation information field may communicate information regarding a 6 GHz frequency channel that the HE AP 104 generates, services, and/or provides. In some embodiments, the HE operation element may be transmitted by the HE AP 104 (or the HE STA 106) on the 2.4/5 GHz band(s). The HE operation element may control (along with one or more other elements, such as the high throughput (HT) operation element and the very high throughput (VHT) operation element) how one or more HE STAs 106 operate in the 2.4/5/6 GHz band(s). In some embodiments, the 6 GHz operation information field has a length of zero (0) or four (4) or more octets. In some embodiments, the HE operation element may provide for enabling tunneling, etc., by which access to the 6 GHz frequency channel is provided via communications on the 2.4/5 GHz (or other) frequency channel. FIG. 10 shows an example of the described HE operation element format 1000.

The element ID, length, and extension fields may include information regarding the HE operation element. The HE operation parameters field of the HE operation element shown above may include 6 GHz present subfield having a length of one or more bits. The 6 GHz present subfield may indicate whether 6 GHz operation is enabled at the AP 104 that transmits the HE operation element. The 6 GHz present subfield may be set to 1 if 6 GHz operation is enabled and set to 0 if 6 GHz operation is disabled or not supported by the AP 104.

Figure 11:
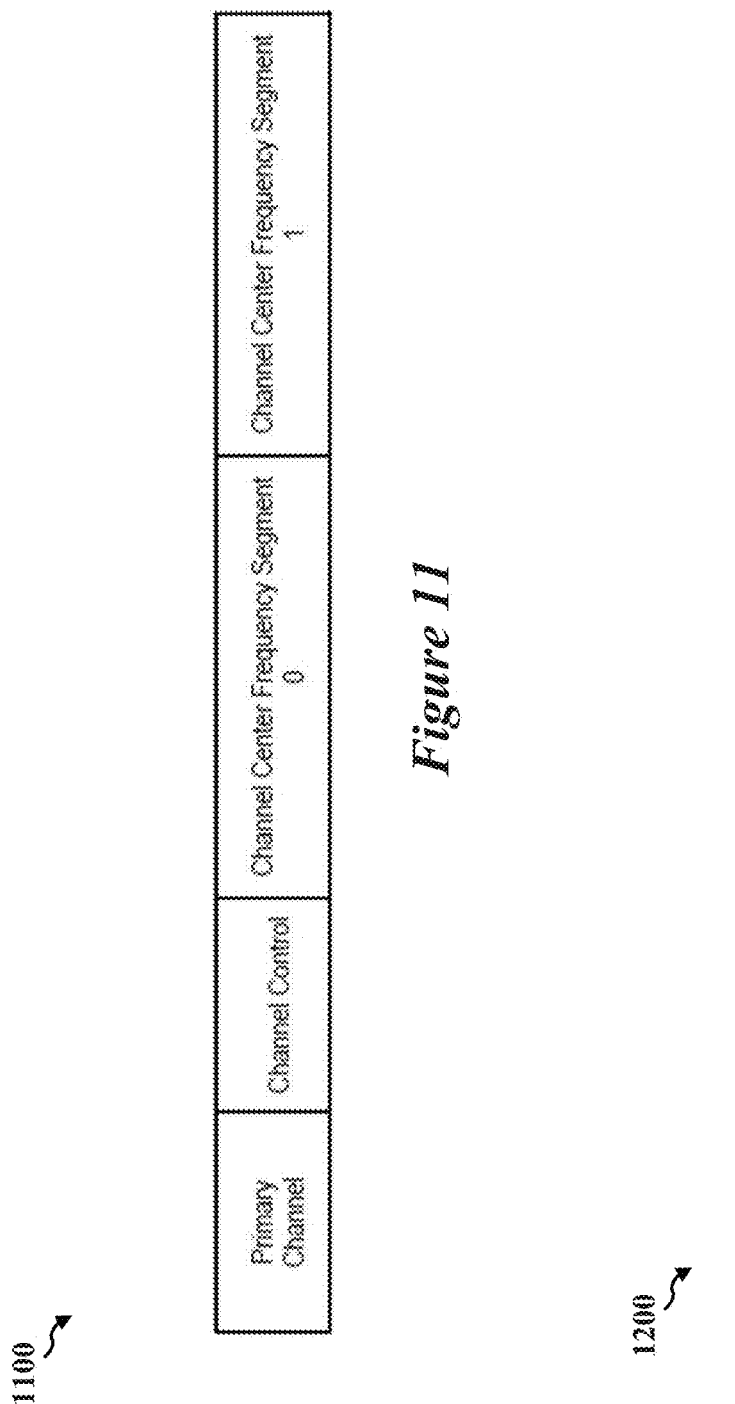
FIG. 11 illustrates an 6 GHz operation information subfield for communication in the wireless communication systems described herein.

In some embodiments, the 6 GHz operation information subfield may be included in the HE operation element when the 6 GHz present subfield in the HE operation parameters field is set to 1. The 6 GHz operation information subfield may provide channel and bandwidth information that is related to the 6 GHz operation (for example, the 6 GHz channelization). FIG. 11 shows an example of the 6 GHz operation information subfield 1100, in some embodiments.

Figure 12:
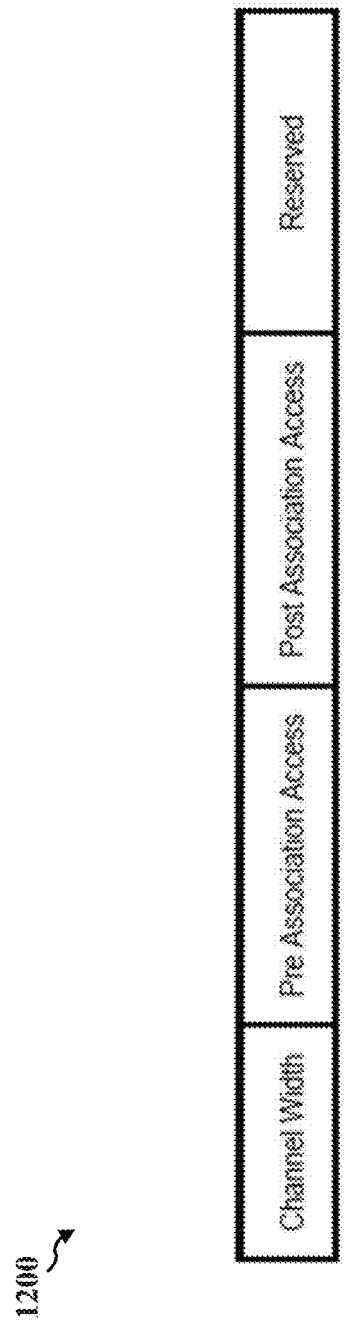
FIG. 12 illustrates an exemplary channel control field for communication in the wireless communication systems described herein.

In some embodiments, the primary channel field may indicate a channel number of a primary channel in the 6 GHz frequency band. The channel control field may define one or more parameters of the 6 GHz frequency primary channel. FIG. 12 shows an exemplary embodiment of the channel control field 1200 described herein.

A channel width subfield of the channel control field may have a length of 0-4 (or more) bits and may indicate a BSS bandwidth. For example, the channel width subfield is set to "0" for a channel width of 20 MHz, "1" for a channel width of 40 MHz, "2" for a channel width of 80 MHz, and "3" for a channel width of 80+80 or 160 MHz. Other values of this field are reserved.

In some embodiments, a pre-association access subfield of the channel control field indicates one or more access rules for pre-association exchanges. The pre-association access subfield is set to "0" if EDCA based pre-association exchanges (communication exchanges) are not allowed in or on the 6 GHz frequency band. The pre-association access subfield is set to "1" if EDCA based pre-association exchanges are permitted in or on the 6 GHz frequency band.

In some embodiments, a post-association access subfield indicates one or more access rules for post-association exchanges (communication exchanges). The post-association access subfield is set to "0" if EDCA based post-association exchanges are not allowed when communicating with the AP 104 that operates on one of the 6 GHz channels and set to "1" if EDCA based post-association exchanges are allowed when communicating with the AP 104 that operates on one of the 6 GHz channels.

A channel center frequency segment 0 field may indicate a channel center frequency for 20, 40, 80, 80+80, 160 MHz HE BSS widths. A channel center frequency segment 1 field may indicate a channel center frequency for a secondary 80 MHz channel of an 80+80 or 160 MHz HE BSS and is set to 0 for a 20, 40, or 80 MHz BSS.

In some embodiments, a STA 106 that sets dot11HEOptionImplemented to true shall set dot11HighThroughputOptionImplemented to true when operating in the 2.4 GHz band. The STA 106 that sets dot11HEOptionImplemented to true shall set dot11VeryHighThroughputOptionImplemented and dot11HighThroughputOptionImplemented to true when operating in the 5 GHz band. The non-AP STA 106 that sets dot11HEOptionImplemented to true shall set dot11MultiBSSIDImplemented to true. The STA 106 that sets dot11HEOptionImplemented to true shall set dot11VeryHighThroughputOptionImplemented and dot11HighThroughputOptionImplemented to false when operating in the 6 GHz band.

An HE STA 106 shall determine the channelization using the information in the primary channel field of the HT operation element when operating in 2.4 GHz and the combination of the information in the primary channel field in the HT operation element and the channel center frequency segment 0 and channel center frequency segment 1 subfields in the VHT operation information field in the VHT operation element when operating in 5 GHz. An HE STA 106 may determines the channelization when operating in 6 GHz.

An HE STA 106 shall not transmit an A-MPDU in an HE PPDU to a STA 106 that exceeds the maximum A-MPDU length capability indicated in the HE capabilities, VHT capabilities, and HT capabilities element received from the recipient STA 106. The maximum A-MPDU length capability is obtained as a combination of the maximum A-MPDU length exponent extension subfield in the HE capabilities element and the maximum A-MPDU length exponent subfield in the VHT capabilities element if the recipient STA 106 has transmitted the VHT capabilities element; otherwise it is obtained from a combination of the maximum A-MPDU length exponent extension subfield in the HE capabilities element and the maximum A-MPDU length exponent subfield in the HT capabilities element.

In some embodiments, the 6 GHz band may provide or support various HE BSS functionality. For example, a BSS started by an HE STA 106 in the 6 GHz band may be a 6G HE BSS. The STA 106 that starts the 6G HE BSS may be able to receive and transmit at each of the <HE-MCS, NSS> tuple values. Accordingly, a data rate of the STA 106 may depend on a number of spatial streams, where a particular MCS will have a different rate depending on the number of spatial streams. In some embodiments, the HE STA 106 having a value of true (for example, "1") for dot11HE6GOptionImplemented shall be capable of operating in the 6 GHz band. The HE STA 106 having a value of true (for example, "1") for dot11HE6GOptionImplemented shall set the 6 GHz support subfield to "1" in the HE capabilities elements the HE STA 106 transmits. Otherwise the 6 GHz support subfield shall be set to "0" in the HE capabilities elements the HE STA 106 transmits.

In some embodiments, the HE STA 106 having the dot11HE6GOptionImplemented equal to true and that is operating in the 6 GHz band is generally referred to as a 6G STA. The 6G STA shall not attempt to join a 6G HE BSS unless the 6G STA supports (i.e., is able to both transmit and receive using) all of the <HE-MCS, NSS> tuples indicated by the 6G AP in the basic high efficiency modulation and coding scheme (HE-MCS) and number of spatial streams (NSS) set. Since the 6 GHz HE BSS will not have any legacy devices (for example, pre-HE devices) communicating in it, the STA 106 may support all HE data rates to be able to join the 6G BSS.

In some embodiments, a 6G AP indicates support for at least 80 MHz channel width if it is operating in the 6 GHz band. In some embodiments, the 6G STA does not transmit HT capabilities, VHT capabilities, HT operation, and VHT operation elements while operating in the 6 GHz band. The 6G STA may include an MPDU and A-MPDU parameters element in Probe Request/Response, Beacon, and/or (Re) Association Request/Response frames that the 6G STA transmits.

The 6G HE STA may not transmit, to another 6G STA, an MPDU in an HE PPDU that exceeds a maximum MPDU length capability indicated in the MPDU and A-MPDU parameters element received from the receiving STA.

In some embodiments, the 6G HE AP or a 6G HE mesh STA shall set the 6 GHz present field to "1" in the HE operation elements that the 6G HE AP or the 6G HE mesh STA transmits. The HE AP or HE mesh STA may set the channel width subfield, the channel center frequency segment 0, and the channel center frequency segment 1 subfields of the 6 GHz operation information field, as defined below (6 GHz HE BSS bandwidth). This may be based on the Rx HE-MCS Map≤80 MHz, Rx HE-MCS Map 160 MHz, and Rx HE-MCS Map 80+80 MHz fields.

| 6 GHz Operation Information Channel Width field | 6 GHz Operation Information Center Frequency Segment 1 subfield | BSS bandwidth |
| --- | --- | --- |
| 0 | 0 | 20 MHz |
| 1 | 0 | 40 MHz |
| 2 | 0 | 80 MHz |
| 3 | Channel Center Frequency Segment 1 (CCFS1) > 0 and \| CCFS1 − CCFS0 \| = 8 | 160 MHz |
| 3 | CCFS1 > 0 and \| CCFS1 − CCFS0 \| > 16 | 80 + 80 MHz |

NOTE 1-
CCFS0 represents the value of the Channel Center Frequency Segment 0 subfield.
NOTE 2-
CCFS1 represents the value of the Channel Center Frequency Segment 1 subfield.

The 6G STA may determine a BSS channelization using the information in the primary channel field in the 6 GHz operation information field in the HE operation element when the 6G STA is operating in the 6 GHz band.

The AP that operates only in the 6 GHz band may set the pre-association access field to "0" in the HE operation elements the AP transmits. The AP that operates in more than one band, which includes the 6 GHz band, may set the pre-association access field to any value.

In some embodiments, the HE STA that intends to associate with the HE AP operating in the 6 GHz band, where the HE AP does not allow active scanning using EDCA in the 6 GHz band, can perform active scanning in the 2.4 GHz and/or 5 GHz band. The AP might temporarily enable active scanning in the 6 GHz band if the AP receives a management request from a non-AP STA in the 2.4 GHz and/or 5 GHz band. Alternatively, the AP may temporarily enable EDCA for a particular non-AP STA for a period of time as defined by the AP. In some embodiments, other non-AP STAs other than a targeted non-AP STA may also communicate or are allowed to communicate during the enabled EDCA period.

An HE STA shall not perform active scanning in the 6 GHz band unless explicitly allowed by the AP to which the STA intends to associate. The AP indicates its pre-association access rules for the 6 GHz band in the Pre Association Access field of the HE Operation element it transmits.

In some embodiments, the HE STA does not transmit broadcast Probe Request frames in the 6 GHz band. In some embodiments, the HE STA does not transmit HT PPDUs in the 6 GHz band. The HE STA may not transmit VHT PPDUs in the 6 GHz band and may not transmit DSSS, HR/DSSS, ERP-OFDM PPDUs in the 6 GHz band.

The HE STA that supports 6 GHz operation may set the 6 GHz support field to 1 in the HE capabilities element contained in management frames that the HE STA transmits in one or more of the 2.4, 5, or 6 GHz bands.

The HE AP which transmits a value of "1" in the 6 GHz Enabled field in the HE operation element and that receives a management frame in the 2.4 and/or 5 GHz band that contains an HE capabilities element from the HE STA with the 6 GHz support field equal to "1", shall include in the management frame that it transmits in response in the 2.4 and/or 5 GHz band, at least one neighbor report element (as described below) that contains information regarding 6 GHz operation if the request contained the HE capabilities element with the 6 GHz support field equal to "1". The HE AP may set the co-located field to 1 in the neighbor report element if the 6 GHz AP is a co-located AP, and otherwise shall set it to "0". In some embodiments, elements specific to the 6 GHz AP may be carried in the optional sub-elements field of the neighbor report element.

In some embodiments, the HE STA performs passive scanning in the 6 GHz band. The HE STA may scan channels that are indicated in the primary channel subfield of the 6 GHz operation Information field in HE operation elements received in the 2.4, 5, or 6 GHz bands. In some embodiments, the HE STA that intends to associate with the 6G HE AP follows the rules specified in a received neighbor discovery element that contains 6 GHz operation information for that AP to interact with that AP in the 6 GHz band.

The HE STA that intends to operate in the 6 GHz band may set dot11SpectrumManagementRequired to true (for example, "1") and may operate according to corresponding rules.

The 6G AP may indicate the disablement of EDCA contention of the associated 6G STAs by setting the post-association access field in the 6 GHz operation information field of the HE operation element it transmits to "1". The 6G AP that supports disablement of EDCA contention of its associated STAs may set the EDCA Disablement Support field in the HE Capabilities element the 6G AP transmits to "1". The 6G AP shall not disable EDCA contention as long as there is at least one 6G STA associated to the 6G AP that has indicated no support for EDCA disablement in the HE capabilities element sent to the AP. The 6G AP may disable EDCA contention for the HE BSS after having disassociated all STAs (if any) that do not support EDCA.

The 6G AP that has disabled EDCA and has a co-located AP in the 2.4 and/or 5 GHz band may include, in management frames the 6G AP transmits in the 6 GHz band, at least one neighbor report element that contains information regarding the co-located BSS. The 6G STA that supports disablement of EDCA contention may set the EDCA disablement support field in the HE capabilities element the 6G STA transmits to "1". The 6G STA that does not support disablement of EDCA may not attempt to associate with a 6G AP that has disabled EDCA contention for its associated STAs. The 6G STA associated with the 6G AP may not contend using EDCA if the post-association field is "1" in the most recently received HE operation element sent by the AP.

FIG. 9 illustrates an exemplary neighbor report information element 900 for communication in the wireless communication systems described herein. The neighbor report information element 900 is generated and transmitted by one of the APs 104, such as the AP 104a. The neighbor report information element 900 includes a plurality of fields used to communicate information regarding a BSSID in proximity to the AP 104a or in which the AP 104a communicates. The neighbor report information element 900 includes a co-located field 922 having a length of at least one bit. The co-located field 922 indicates whether the AP 104 represented by the neighbor report (i.e., BSSID) information element is collocated with the AP 104a reporting neighbor report information element 900. When the co-located field 922 is set to "1", the AP 104 represented by the neighbor report information element 900 is co-located with the AP 104a that is reporting the neighbor report information element 900. When the co-located field 922 is set to "0", the AP 104 represented by the neighbor report information element 900 is not co-located with the AP 104a that is reporting the neighbor report information element 900.

In some embodiments, the neighbor report information element may include a field or element that identifies one or more sub-element identifiers. As shown, the optional sub-element identifiers may be extensible, for example, as needed. Accordingly, a sub-element identifier of 195 corresponds to a power constraint element, which is extensible in some embodiments and not extensible in some embodiments. In some embodiments, the power constraint sub-element corresponds to an element that contains information necessary to allow the STA 106 to determine a local maximum transmit power in a current channel. A sub-element identifier of 196 corresponds to a transmit power envelope element, which is extensible in some embodiments. In some embodiments, the transmit power envelope sub-element corresponds to an element that conveys the local maximum transmit power for various transmission bandwidths. A sub-element identifier of 197 corresponds to a TWT element that is extensible in some embodiments. The TWT sub-element may correspond to an element that carries schedule information for different service periods (SPs). For example, one or more TWT Parameter sets (which define properties) may be carried in the element for each SP schedule. The parameter set includes (along with other properties) a periodicity and length of the SP. In some embodiments, the TWT sub-element may carry a schedule or identify if communications are scheduled. In some embodiments, the TWT sub-element may be extended to carry one or more schedules for communications on a particular frequency channel (for example, the 6 GHz frequency channel. The TWT sub-element may include one or more schedules for pre-association communications, post-association communications, EDCA communication periods, and/or triggers/trigger periods. A sub-element identifier of 198 may correspond to a UORA parameter set sub-element that may be extensible. In some embodiments, the UORA parameter set sub-element corresponds to an element in that carries parameters required for performing trigger based random access with the AP 104 advertising the element, excluding the element ID extension field. In some embodiments, a high efficiency (HE) STA that is configured to communicate or capable of communicating in the 6 GHz frequency channel may generate and transmit an MPDU and A_MPDU parameters element that declares MPDU and A-MPDU capabilities of the HE STA. In some embodiments, an MPDU and A-MPDU Parameters information element is defined to communicate such MPDU and A-MPDU capabilities. The MPDU and A-MPDU parameters information element may include an element ID field (1 byte), a length field (1 byte), an element ID extension field (1 byte), and an A-MPDU parameters field (2 bytes). The A-MPDU parameters field may include four sub-fields, including a 3-bit subfield of minimum MPDU start spacing, a 3-bit subfield of maximum A-MPDU length exponent, a 3-bit subfield of maximum MPDU length, and a 7-bit subfield that is reserved for further content.

In some embodiments, the minimum MPDU start spacing subfield corresponds to the Minimum MPDU Start Spacing subfield defined in 9.4.2.55.3 (A-MPDU Parameters field). Similarly, the maximum A-MPDU length exponent subfield may correspond to the maximum A-MPDU length exponent subfield defined in FIG. 9-589 (VHT Capabilities Information field). Additionally, the maximum MPDU length subfield may correspond to the maximum MPDU length subfield defined in FIG. 9-589 (VHT Capabilities Information field). In some embodiments, the neighbor report indicates the EDCA permission, and power-constraints of the neighboring APs, among others.

In some embodiments, post-association up-link medium access guidelines provide AP 104 controlled access to the second frequency channel. Trigger-based access may be provided where the STAs 106 respond to trigger frames from the APs 104. Additionally, the APs 104 may not permit UL SU transmissions using EDCA access in a preferred mode of operation. In some embodiments, the AP 104 may permit EDCA any time. Alternatively, or additionally, EDCA may only be permitted by the AP 104 during scheduled EDCA service periods. The STAs 106 may contend using EDCA only during the EDCA service periods allocated by the AP 104, which provides a tradeoff between fully scheduled access and fully distributed access. In some embodiments, broadcast TWT like mechanisms may be used for scheduling EDCA and non-EDCA windows.

In the above description, reference numbers may have been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor or any commercially available processor, controller, microcontroller or state machine. A processor may also be implemented as a combination of computing devices (e.g., a combination of a DSP and a microprocessor, a plurality of microprocessors, one or more microprocessors in conjunction with a DSP core, or any other such configuration).

In one or more aspects, the functions described may be implemented in hardware, software, firmware, or any combination thereof. If implemented in software, the functions may be stored on or transmitted over as one or more instructions or code on a computer-readable medium.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method of controlling network access, comprising:
   transmitting, by a first access point corresponding to a first network, a first beacon over the first network to a station, the first beacon including information allowing the station to associate with the first access point;
   receiving a probe request at the first access point over the first network from the station, the probe request including a request for rules for associating with a second access point corresponding to a second network different than the first network;
   generating a probe response to include the rules regarding associating with the second access point corresponding to the second network, wherein the rules do not permit uncontrolled communications over the second network; and
   transmitting the probe response from the first access point to the station over the first network.

2. The method of claim 1, wherein the rules permit at least one of passive scanning of the second network by the station, passive scanning of the second network based on a target beacon transmission time (TBTT) offset, active scanning of the second network based on a target wake time (TWT) offset, and active or passive scanning on one or more discovery channels.

3. The method of claim 2, wherein the rules indicate to the station to begin one or more of the active scanning on the one or more discovery channels or listening for a fast initial link setup (FILS) discovery frame on the one or more discovery channels during the passive scanning.

4. The method of claim 2, wherein the TBTT offset indicates a target time at which a second beacon on the second network is expected and wherein the TWT offset comprises a duration between the probe response and a first access window on the second network.

5. The method of claim 2, wherein the probe response indicates to the station an access window on the second network during which the station is permitted to perform the active scanning on the second network and indicates to the station an access window on the second network during which the station is permitted to transmit another probe request and receive a probe response over the second network.

6. The method of claim 5, wherein the probe response further includes an indication that the access window is trigger enabled or permits single user (SU) enhanced distributed channel access (EDCA).

7. The method of claim 6, wherein the indication that the access window permits the SU EDCA that at least one period during which the SU EDCA access is temporarily enabled.

8. The method of claim 1, wherein the probe response indicates at least one of a channel number for communicating on the second network or a basic service set identifier (BSSID) of the second network.

9. The method of claim 1, further comprising transmitting one or more fast initial link setup (FILS) discovery frames to the station on the second network, wherein the one or more FILS discovery frames indicate to the station whether active or passive scanning is permitted on the second network.

10. The method of claim 9, wherein the one or more FILS discovery frames provide at least a TBTT offset and indicate to the station one or more of whether unsolicited probing is permitted on the second network, whether TWT service periods exist on the second network during which unsolicited probing by the station is permitted, or whether trigger frames are transmitted on the second network identifying random access resource units during which the station is permitted to transmit management frames on the second network.

11. A method of accessing networks, comprising:
receiving, by a station from a first access point corresponding to a first network, a first beacon over the first network, the first beacon including information allowing the station to associate with the first access point;
transmitting a probe request from the station to the first access point, the probe request including a request for rules for associating with a second access point corresponding to a second network different than the first network;
receiving, at the station, a probe response from the first access point over the first network, the probe response including the rules regarding associating with the second access point corresponding to the second network, wherein the rules do not permit uncontrolled communications over the second network; and
receiving, at the station, a second beacon over the second network based on the rules received in the probe response.

12. The method of claim 11, wherein the rules permit at least one of passive scanning of the second network by the station, passive scanning of the second network based on a target beacon transmission time (TBTT) offset, active scanning of the second network based on a target wake time (TWT) offset, or active or passive scanning on one or more discovery channels.

13. The method of claim 12, wherein the rules indicate to the station to begin one or more of the active scanning on the one or more discovery channels or listening for a fast initial link setup (FILS) discovery frame on the one or more discovery channels during the passive scanning.

14. The method of claim 12, further comprising:
identifying, by the station and based on the TBTT offset, a target time at which a second beacon on the second network is expected, and
identifying, based on the TWT offset, a duration between the probe response and a first access window on the second network.

15. The method of claim 12, further comprising:
identifying, by the station and based on the permitted active scanning and the TWT offset received in the probe response, an access window on the second network during which the station is permitted to perform active scanning on the second network, and
transmitting another probe request from the station over the second network during the identified access window; and
receiving another probe response at the station over the second network during the identified access window.

16. The method of claim 15, wherein the station transmits the other probe request using one of controlled single user (SU) enhanced distributed channel access (EDCA) or random access based on whether the identified access window permits EDCA or is trigger enabled.

17. The method of claim 16, wherein the controlled single user (SU) enhanced distributed channel access (EDCA) comprises at least one period during which the SU EDCA access by the station is enabled.

18. The method of claim 11, wherein the probe response indicates at least one of a channel number for communicating on the second network or a basic service set identifier (BSSID) of the second network and wherein the probe response comprises all information needed for the station to associate with the second access point on the second network.

19. The method of claim 11, further comprising receiving one or more fast initial link setup (FILS) discovery frames over the second network, wherein the one or more FILS discovery frames indicate to the station whether active or passive scanning is permitted on the second network.

20. The method of claim 19, further comprising determining, based on the one or more FILS discovery frames, whether to follow the rules and transmit the probe request or to defer transmission of the probe request and receive a second beacon based on at least a TBTT offset received in the one or more FILS discovery frames.

21. An apparatus for network access, comprising:
a processor configured to generate a first beacon comprising information allowing a station to associate with the apparatus;
a transmit circuit configured to transmit the first beacon to the station over a first network associated with the apparatus; and a receiver circuit configured to receive a probe request from the station over the first network, the probe request comprising a request for rules for associating with a second access point corresponding to a second network different than the first network, the processor further configured to generate a probe response to include the rules regarding associating with the second access point corresponding to the second network, wherein the rules do not permit uncontrolled communications over the second network, the transmit circuit further configured to transmit the probe response to the station over the first network.

22. The apparatus of claim 21, wherein the rules permit at least one of passive scanning of the second network by the station, passive scanning of the second network based on a target beacon transmission time (TBTT) offset, active scanning of the second network based on a target wake time (TWT) offset, or active or passive scanning on one or more discovery channels.

23. The apparatus of claim 22, wherein the rules indicate to the station to begin one or more of the active scanning on the one or more discovery channels or listening for a fast initial link setup (FILS) discovery frame on the one or more discovery channels during the passive scanning.

24. The apparatus of claim 22, wherein the TBTT offset indicates a target time at which a second beacon on the second network is expected and wherein the TWT offset comprises a duration between the probe response and a first access window on the second network.

25. The apparatus of claim 22, wherein the probe response indicates to the station an access window on the second network during which the station is permitted to perform the active scanning on the second network and indicates to the station an access window on the second network during which the station is permitted to transmit another probe request and receive a probe response over the second network.

26. The apparatus of claim 25, wherein the probe response further includes an indication that the access window is trigger enabled or permits single user (SU) enhanced distributed channel access (EDCA).

27. The apparatus of claim 26, wherein:
the indication that the access window permits SU EDCA also indicates at least one period during which the SU EDCA access is temporarily enabled; and
the probe response indicates at least one of a channel number for the second access point or a basic service set identifier (BSSID) of the second access point.

28. The apparatus of claim 21, wherein the probe response comprises all information needed for the station to associate with the second access point on the second network and wherein the probe response is transmitted on the first network.

29. The apparatus of claim 21, wherein the transmit circuit is further configured to transmit one or more fast initial link setup (FILS) discovery frames to the station on the second network, wherein the one or more FILS discovery frames indicate to the station whether active or passive scanning is permitted on the second network.

30. An apparatus for accessing networks, the apparatus comprising:
a receiver circuit configured to receive, from a first access point corresponding to a first network, a first beacon over the first network, the first beacon including information allowing the apparatus to associate with the first access point;
a processor configured to generate a probe request for transmission to the first access point, the probe request comprising a request for rules for associating with a second access point corresponding to a second network different than the first network; and
a transmit circuit configured to transmit the probe request to the first access point over the first network,
the receiver circuit further configured to:
receive a probe response from the first access point over the first network, the probe response including the rules regarding associating with the second access point corresponding to the second network, wherein the rules do not permit uncontrolled communications over the second network; and
receive a second beacon from the second access point over the second network based on the rules received in the probe response.

* * * * *